(12) United States Patent
Johansson et al.

(10) Patent No.: US 10,963,803 B2
(45) Date of Patent: Mar. 30, 2021

(54) SYSTEM AND METHOD FOR MACHINE LEARNING BASED QOE PREDICTION OF VOICE/VIDEO SERVICES IN WIRELESS NETWORKS

(71) Applicant: InfoVista Sweden AB, Skellefteå (SE)

(72) Inventors: Per Johansson, Skellefteå (SE); Irina Cotanis, Warrenton, VA (US)

(73) Assignee: InfoVista Sweden AB, Skellefteå (SE)

( * ) Notice: Subject to any disclaimer, the term of this patent is extended or adjusted under 35 U.S.C. 154(b) by 367 days.

(21) Appl. No.: 16/124,081

(22) Filed: Sep. 6, 2018

(65) Prior Publication Data

US 2019/0073603 A1 Mar. 7, 2019

Related U.S. Application Data

(60) Provisional application No. 62/554,790, filed on Sep. 6, 2017.

(51) Int. Cl.
G06N 5/04 (2006.01)
H04L 29/06 (2006.01)
G06N 20/00 (2019.01)
H04L 12/24 (2006.01)
H04L 12/26 (2006.01)

(52) U.S. Cl.
CPC .............. *G06N 5/048* (2013.01); *G06N 20/00* (2019.01); *H04L 41/142* (2013.01); *H04L 41/145* (2013.01); *H04L 41/147* (2013.01); *H04L 65/608* (2013.01); *H04L 65/80* (2013.01); *H04L 43/087* (2013.01)

(58) Field of Classification Search
None
See application file for complete search history.

(56) References Cited

U.S. PATENT DOCUMENTS

2015/0310334 A1 10/2015 Huang

FOREIGN PATENT DOCUMENTS

WO WO 2015/144211 10/2015

OTHER PUBLICATIONS

International Preliminary Report on Patentability (IPRP) mailed Oct. 5, 2020 in International Application No. PCT/US2018/049794.
M. S. Mushtaq et al. "Empirical Study based on Machine Learning Approach to Assess the QoS/QoE Correlation" (2012) IEEE Xplore.
International Search Report dated Nov. 29, 2018, in counterpart International (PCT) Application No. PCT/US2018/049794.
Written Opinion dated Nov. 29, 2018, in counterpart International (PCT) Application No. PCT/US2018/049794.

*Primary Examiner* — Alan Chen
(74) *Attorney, Agent, or Firm* — Womble Bond Dickinson (US) LLP

(57) ABSTRACT

A framework system and method for developing hybrid voice/video QoE predictors, which use both network/codec/client parameters as well as the voice/video reference sample(s). The prediction model/algorithm uses deep packet inspection to produce relevant input and therefore the network's impact on the voice/video QoE can be determined without recording actual media (voice/video) content. Therefore, the QoE predictors are neither solely media based as available perceptual metrics, nor available parametric based. The present hybrid voice/video QoE uses the reference/original media information, unlike prior art hybrid video only QoE which use the recorded media (video only).

16 Claims, 18 Drawing Sheets

Framework Structure

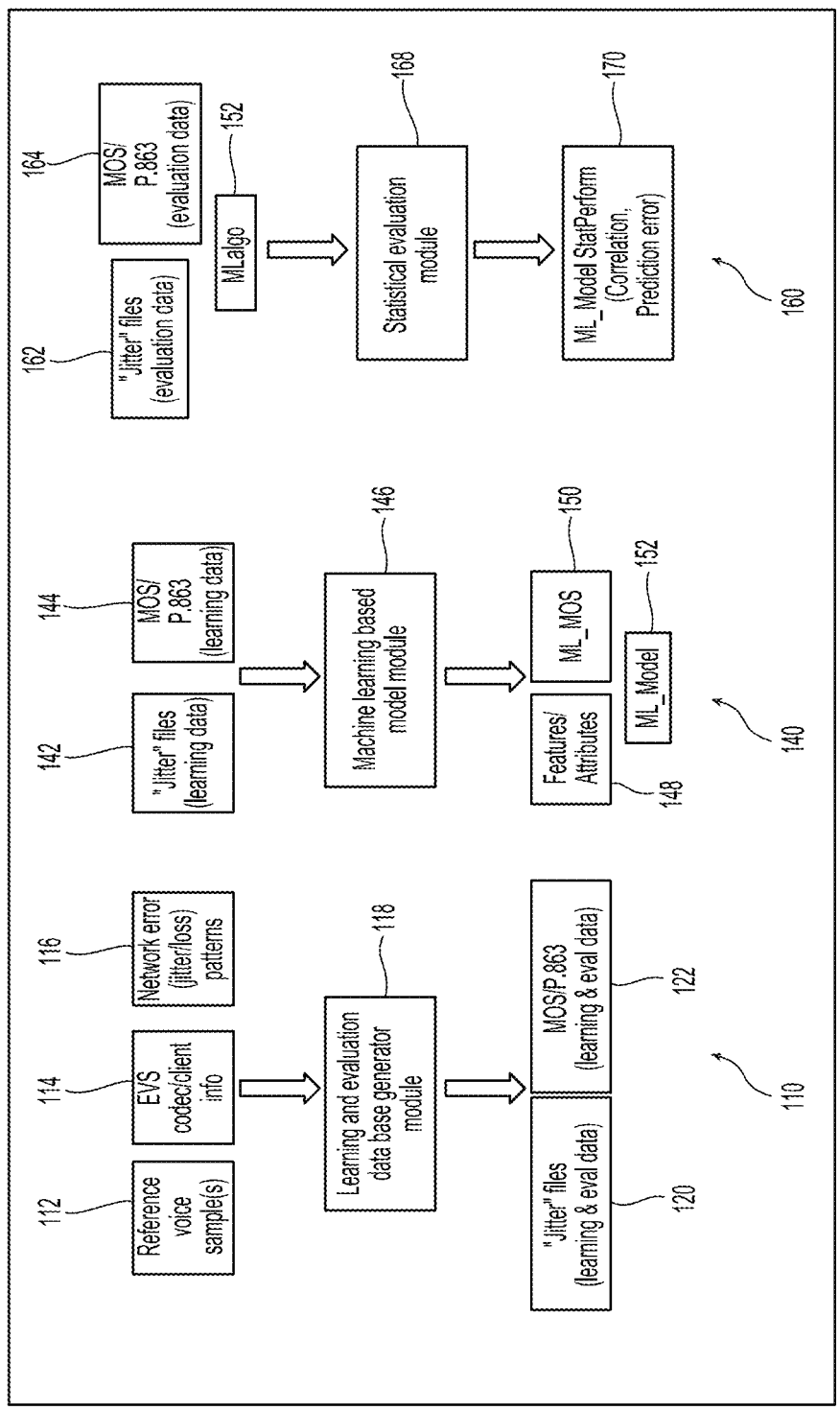
*Fig. 1* - Framework Structure

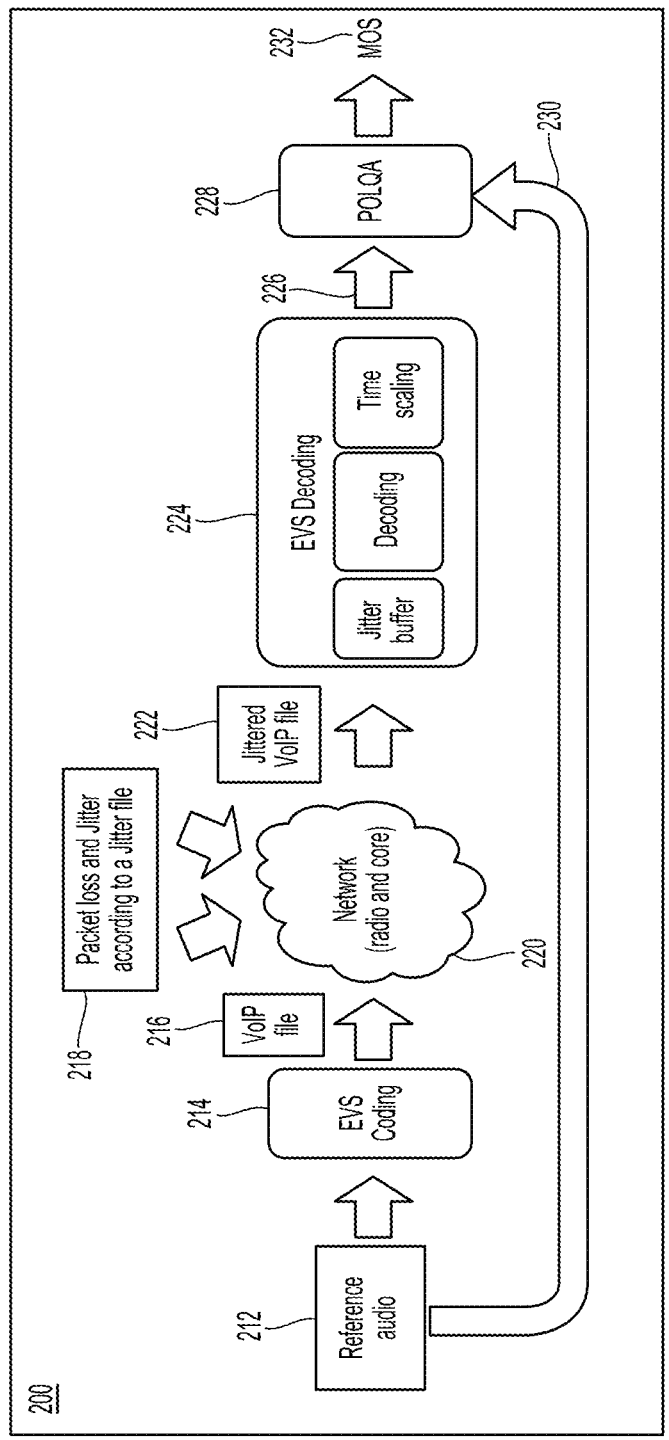
*Fig. 2* - Simulation Chain

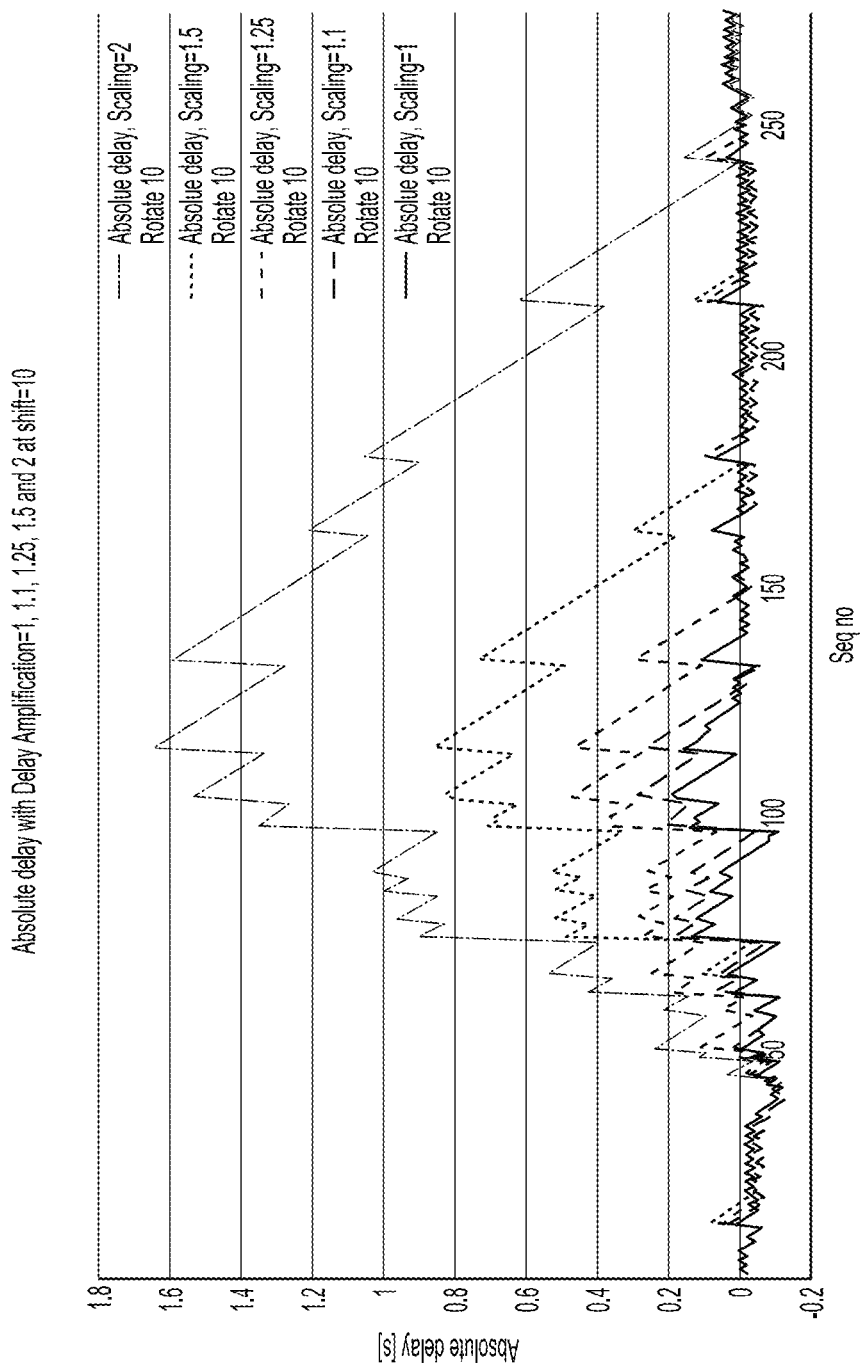
Fig. 3 - Delay amplifications for a life base Jitter file

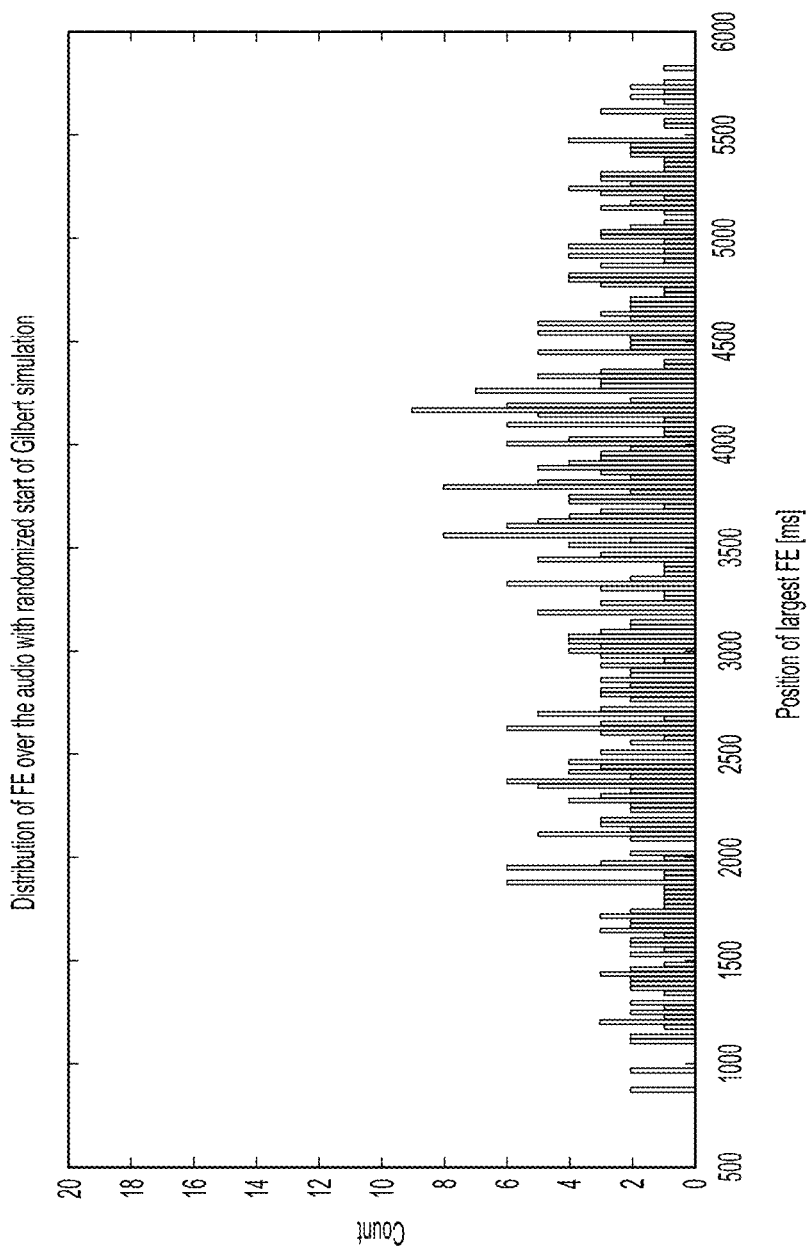
*Fig. 4* - Frame Erasure (FE) due to late loss is evenly distrubuted over the audio

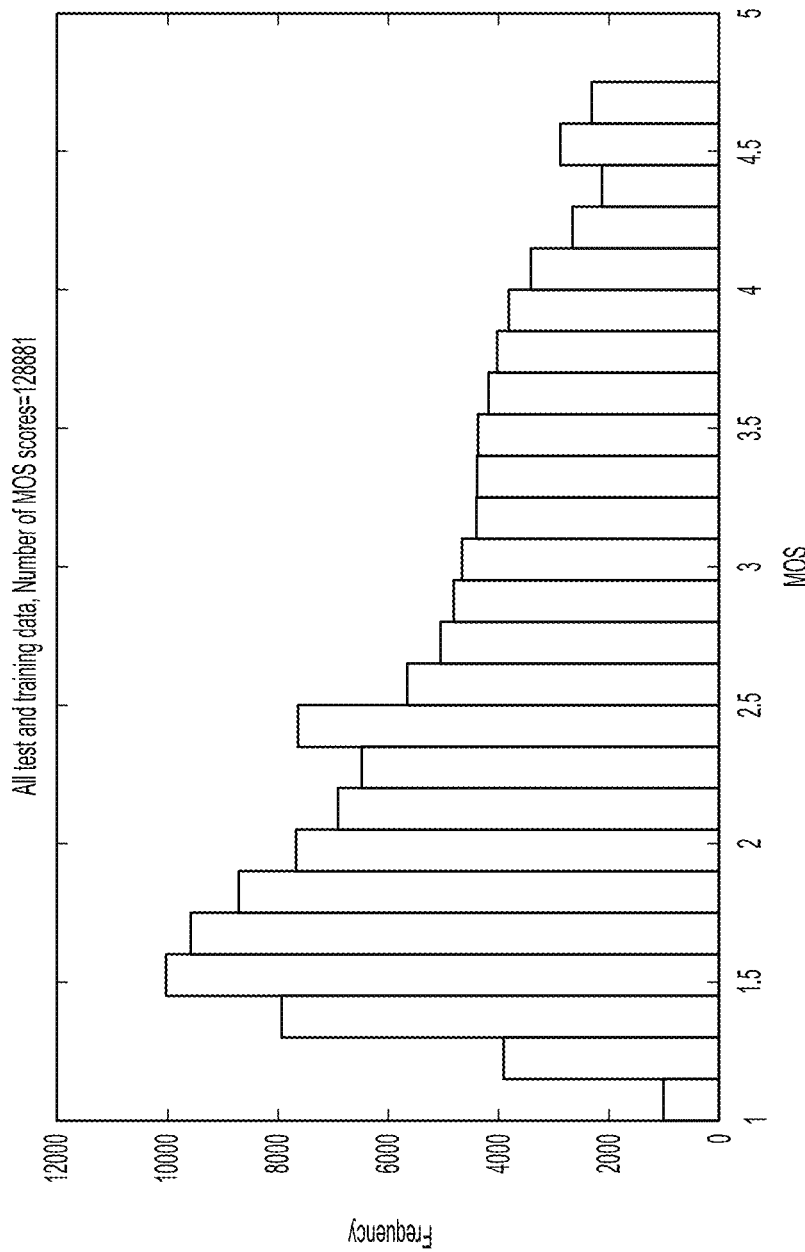
Fig. 5 - Distribution of all test and training MOS values

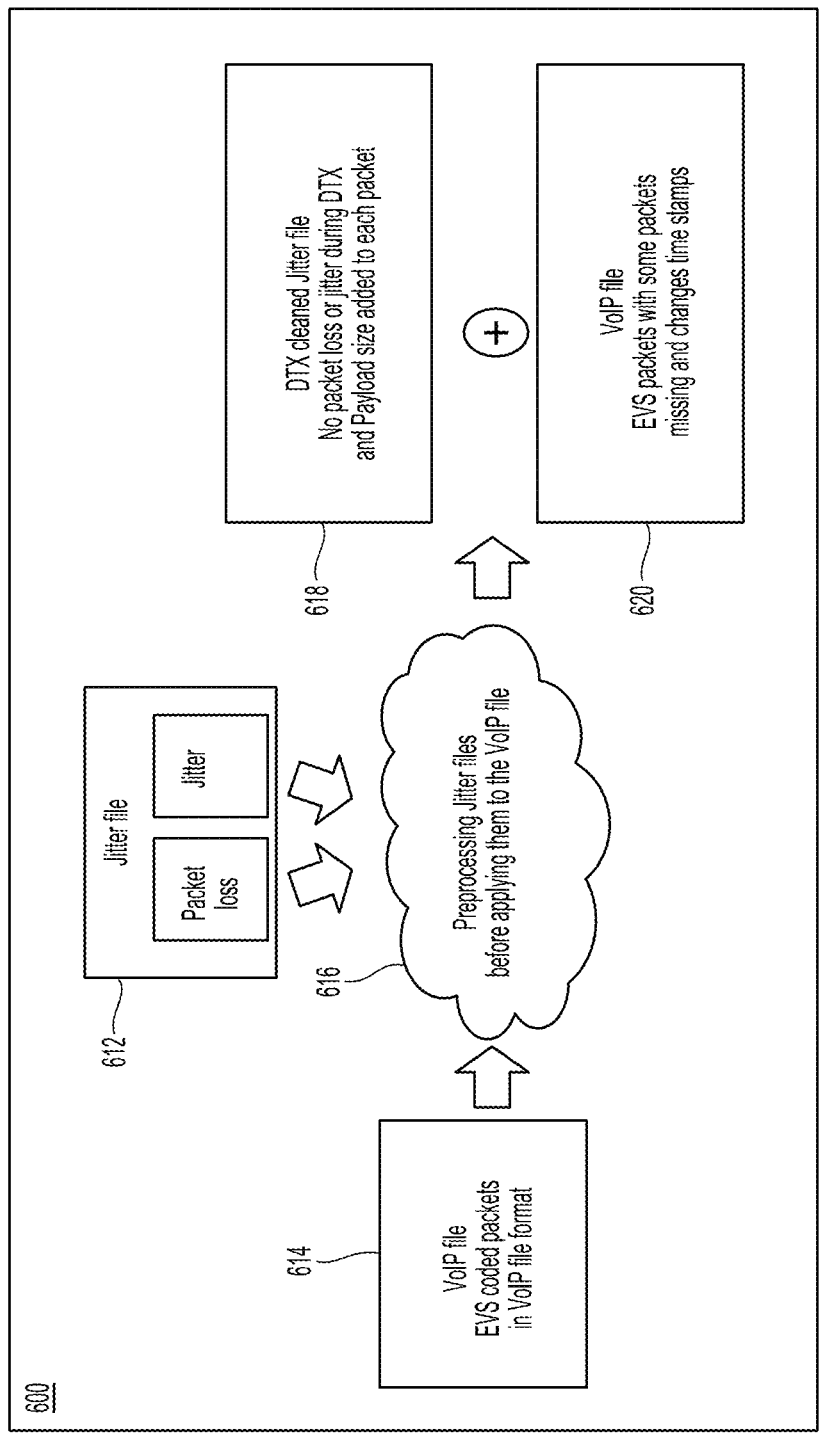
*Fig. 6* - Pre-processing of the Jitter file

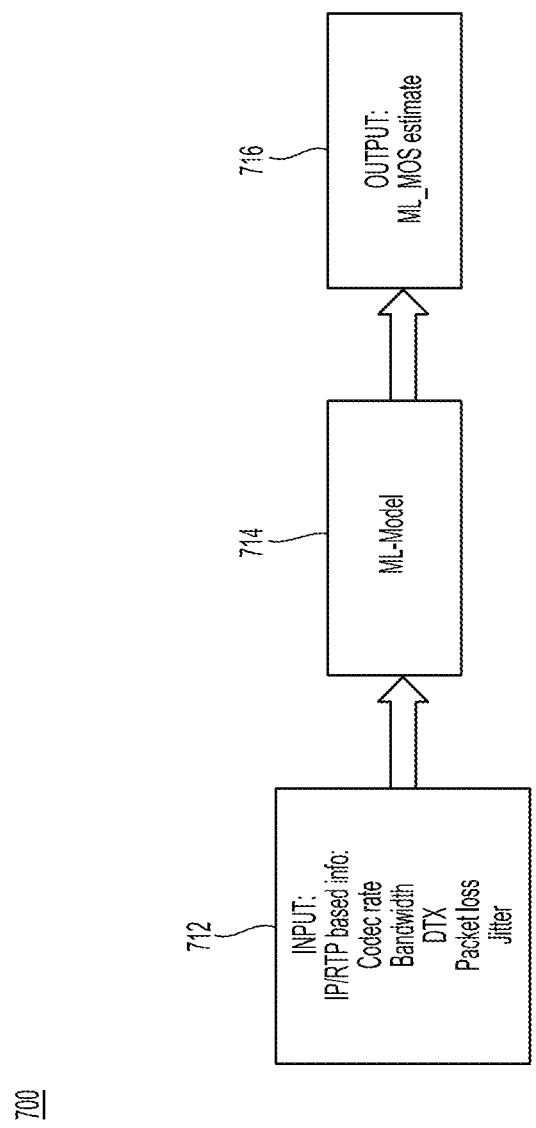
*Fig. 7* - Machine learning based model architecture

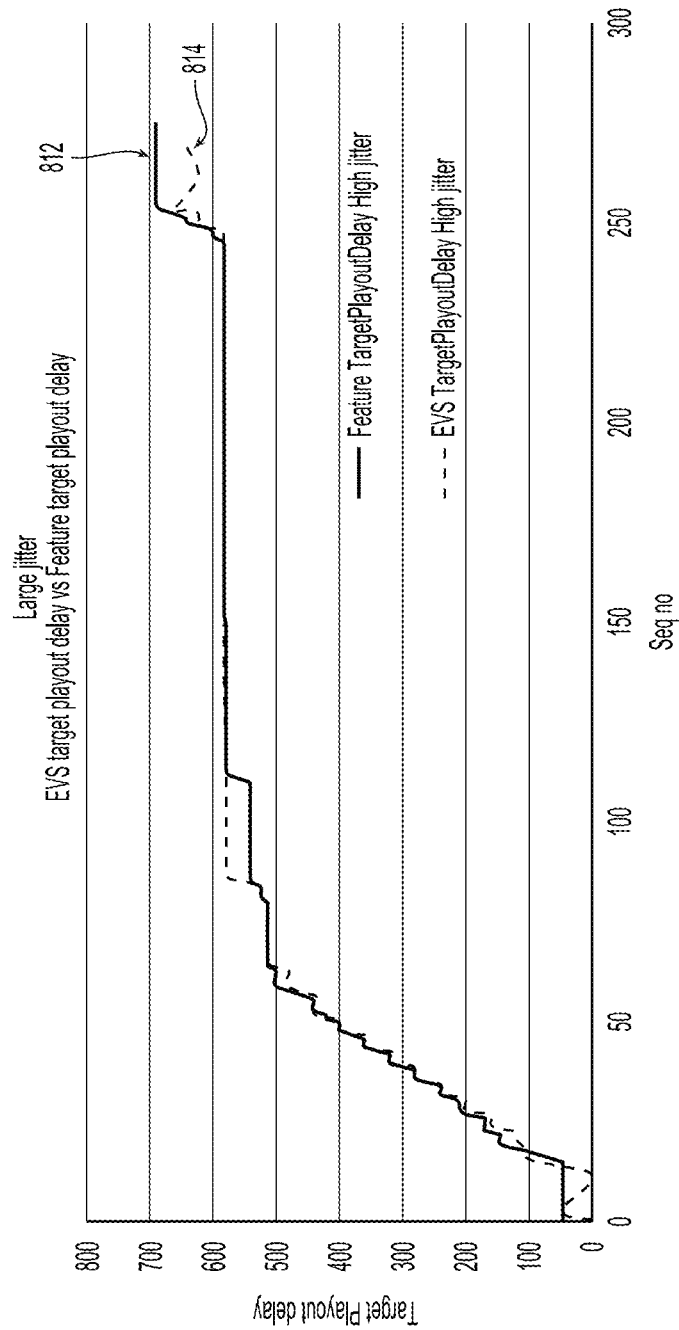
*Fig. 8* - Calculated target playout delay feature and real EVS client target playout

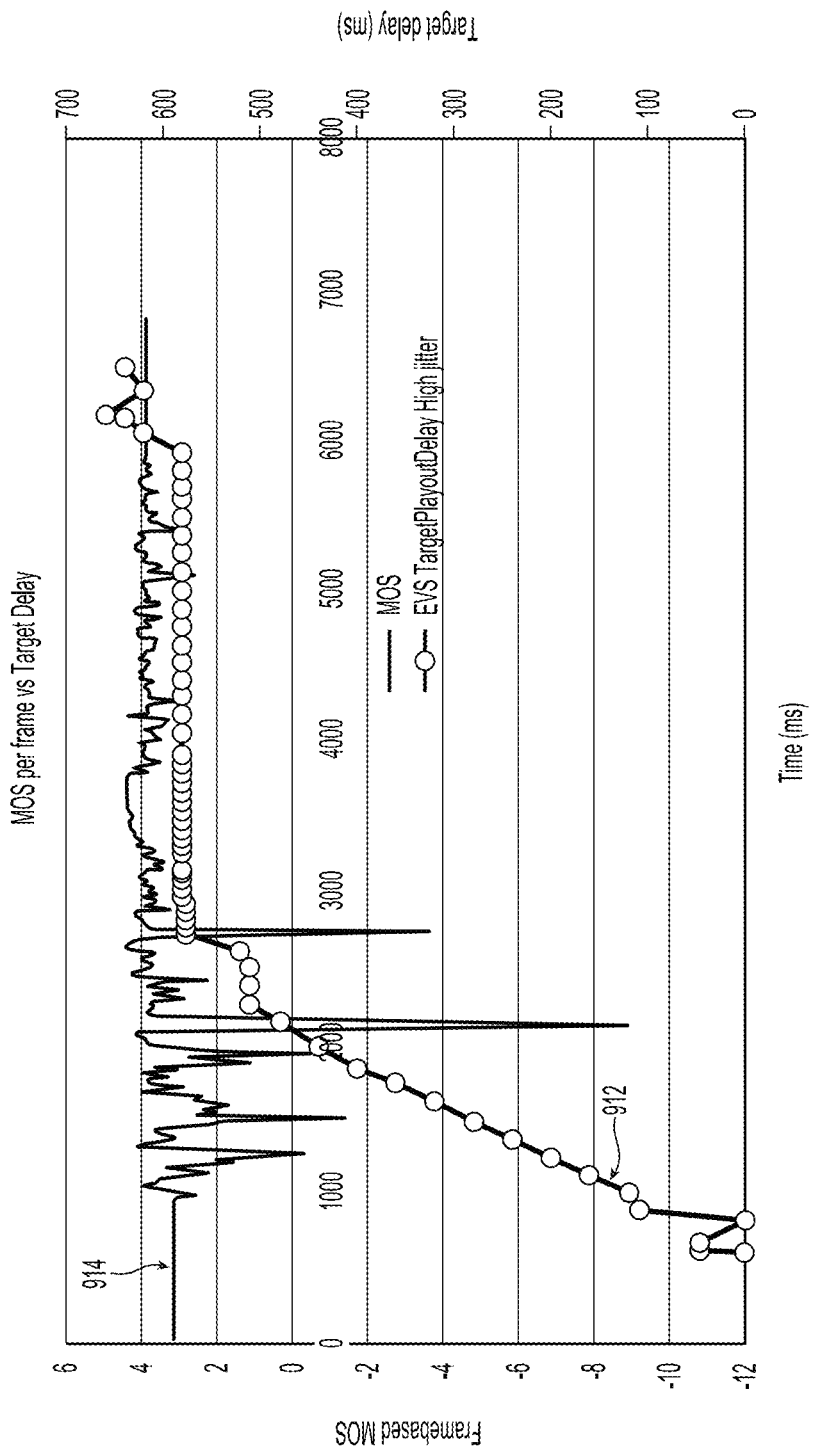
Fig. 9 - MOS and target delay during one audio reference of 5.5s

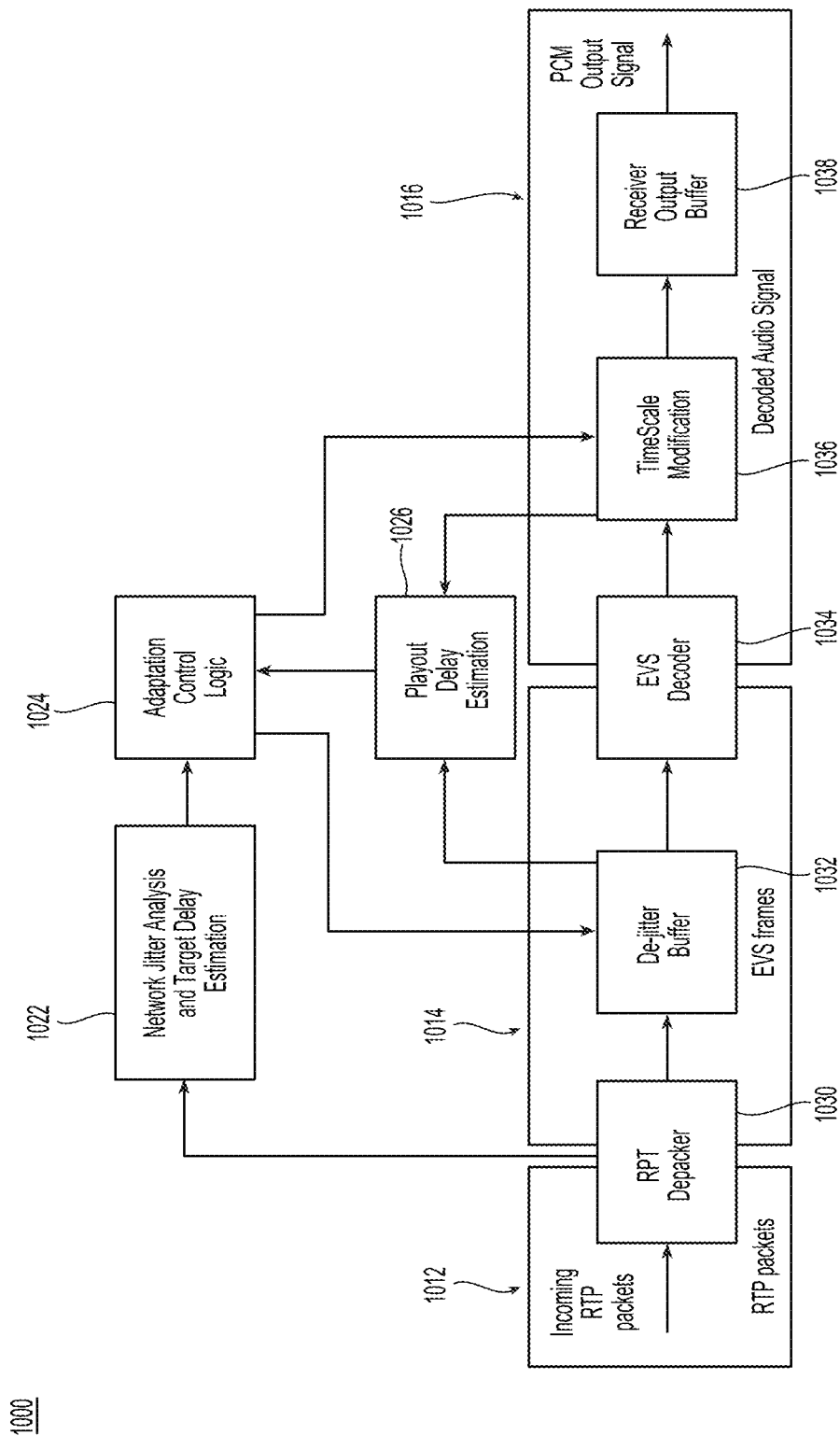
Fig. 10 - Modules of the EVS Jitter Buffer Management Solution from 3GPP TS 26.448

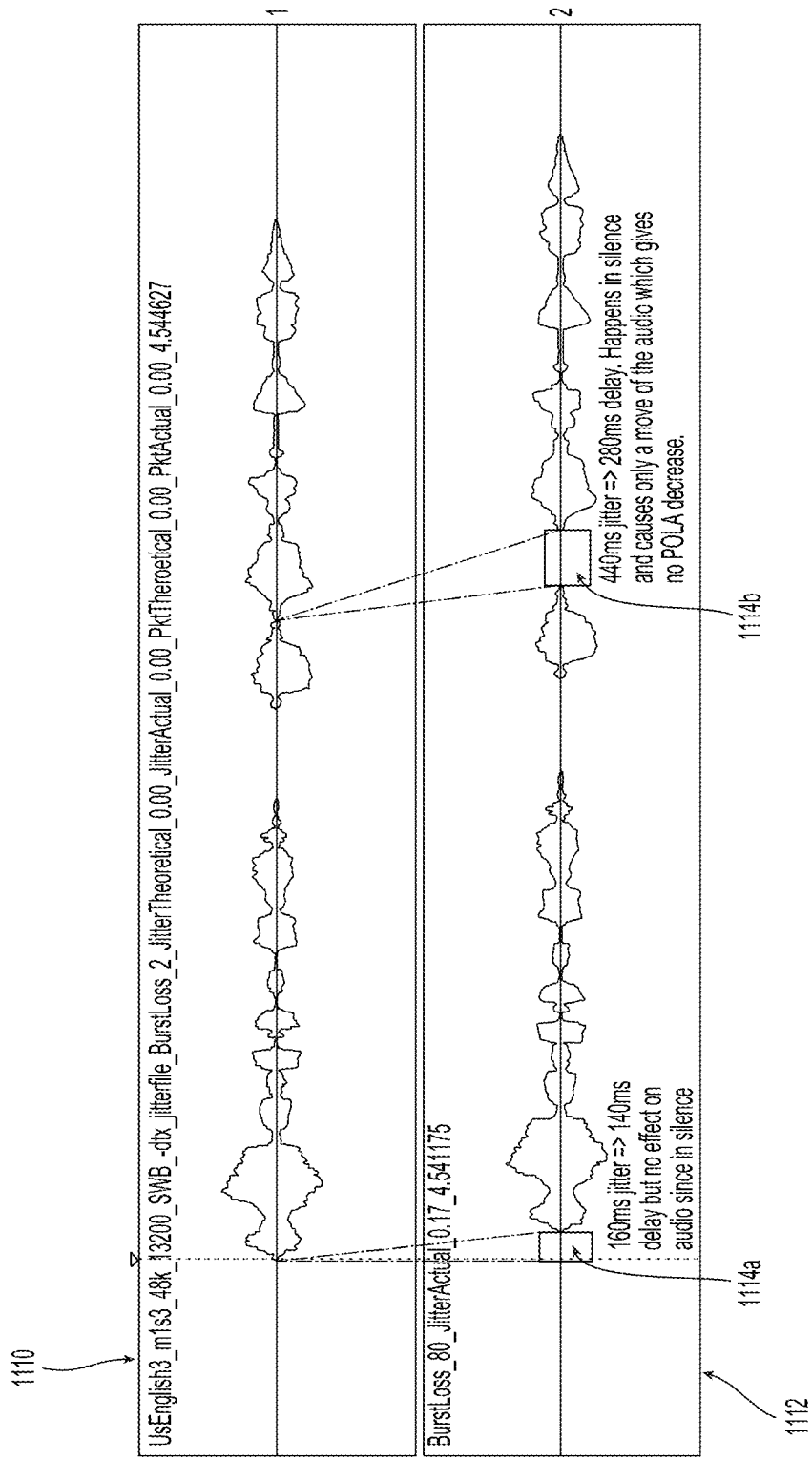
Fig. 11 - Two long jitter delays in silent parts have no effect on MOS. Both these examples have the same MOS of 4.5

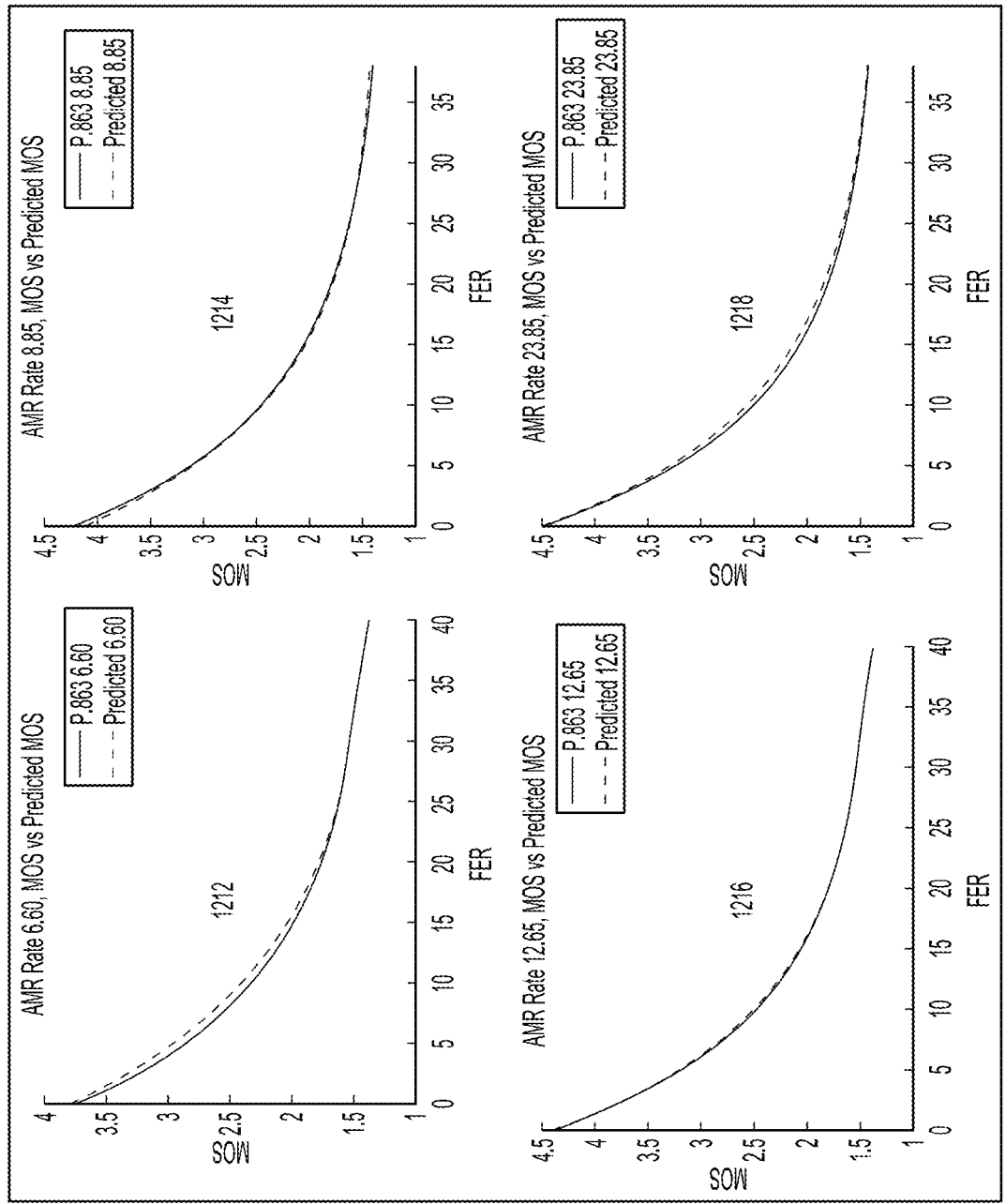
*Fig. 12A* - MOS/P.863 vs MOS from Predicted MOS (output of Machine Learning based framework) for low Frame Error Rate

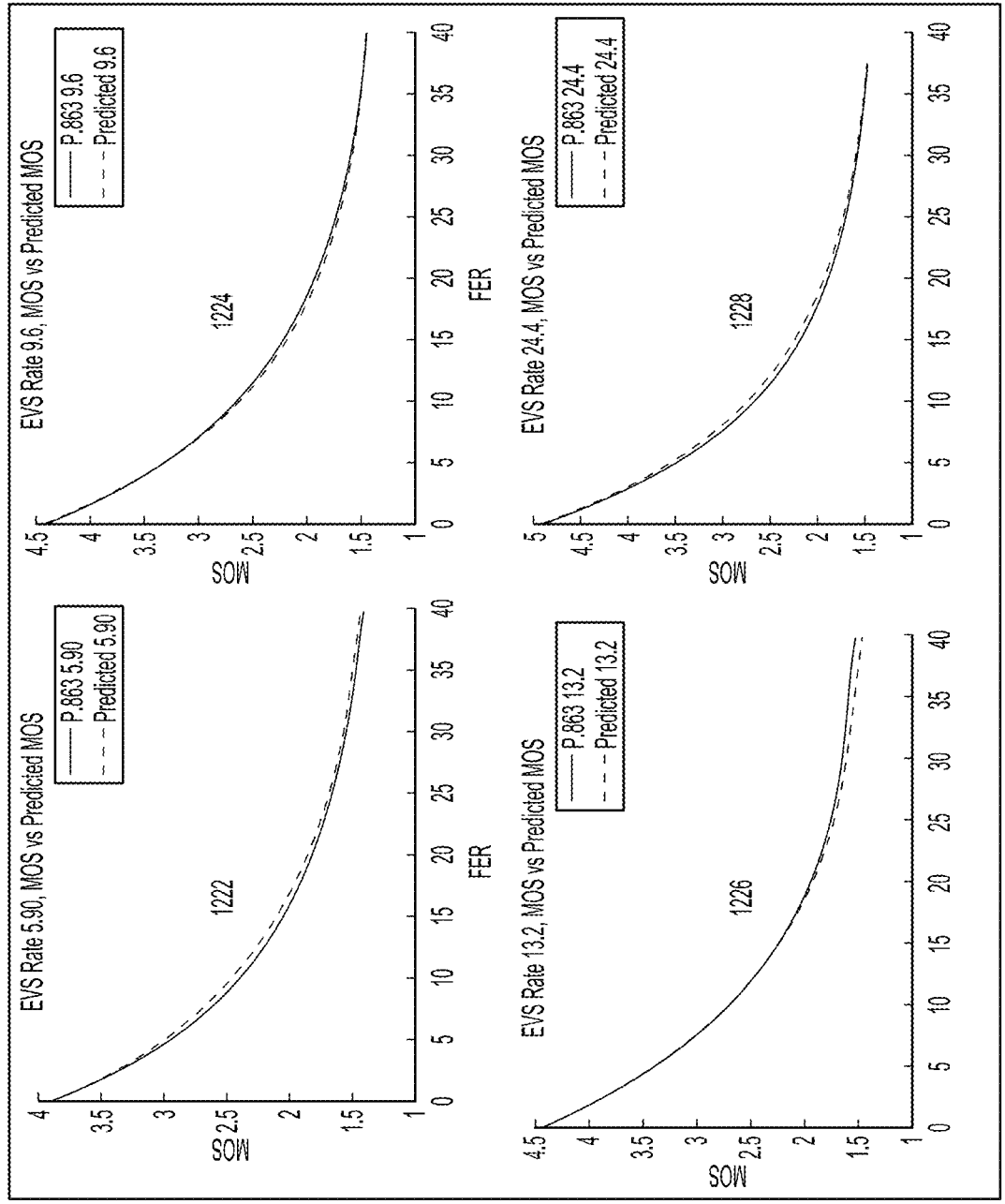
Fig. 12B - MOS/P.863 vs MOS from Predicted MOS (output of Machine Learning based framework) for low Frame Error Rate

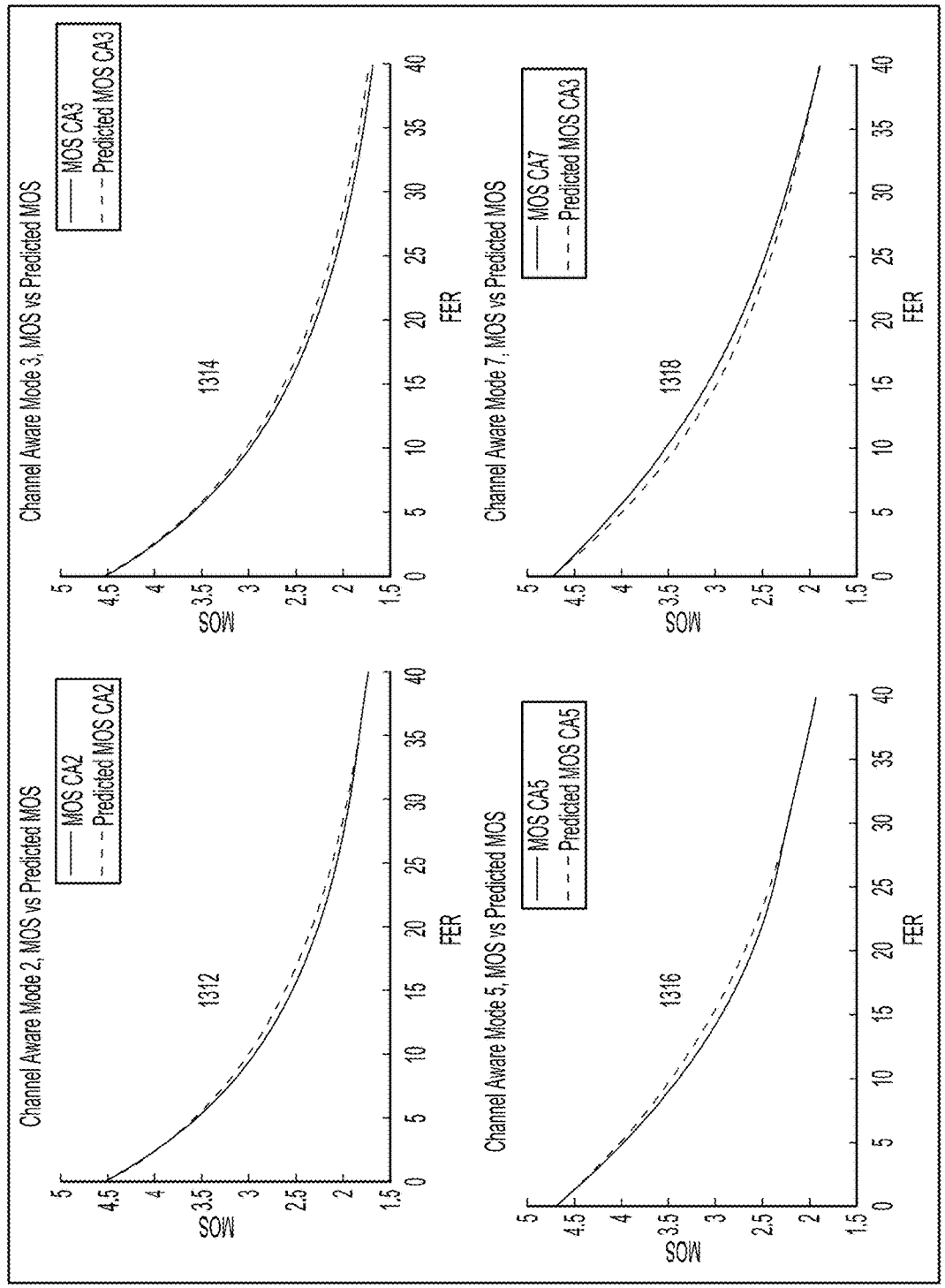
*Fig. 13* - MOS/P.863 vs MOS from Predicted MOS (output of Machine Learning based framework) for all Channel Aware Modes

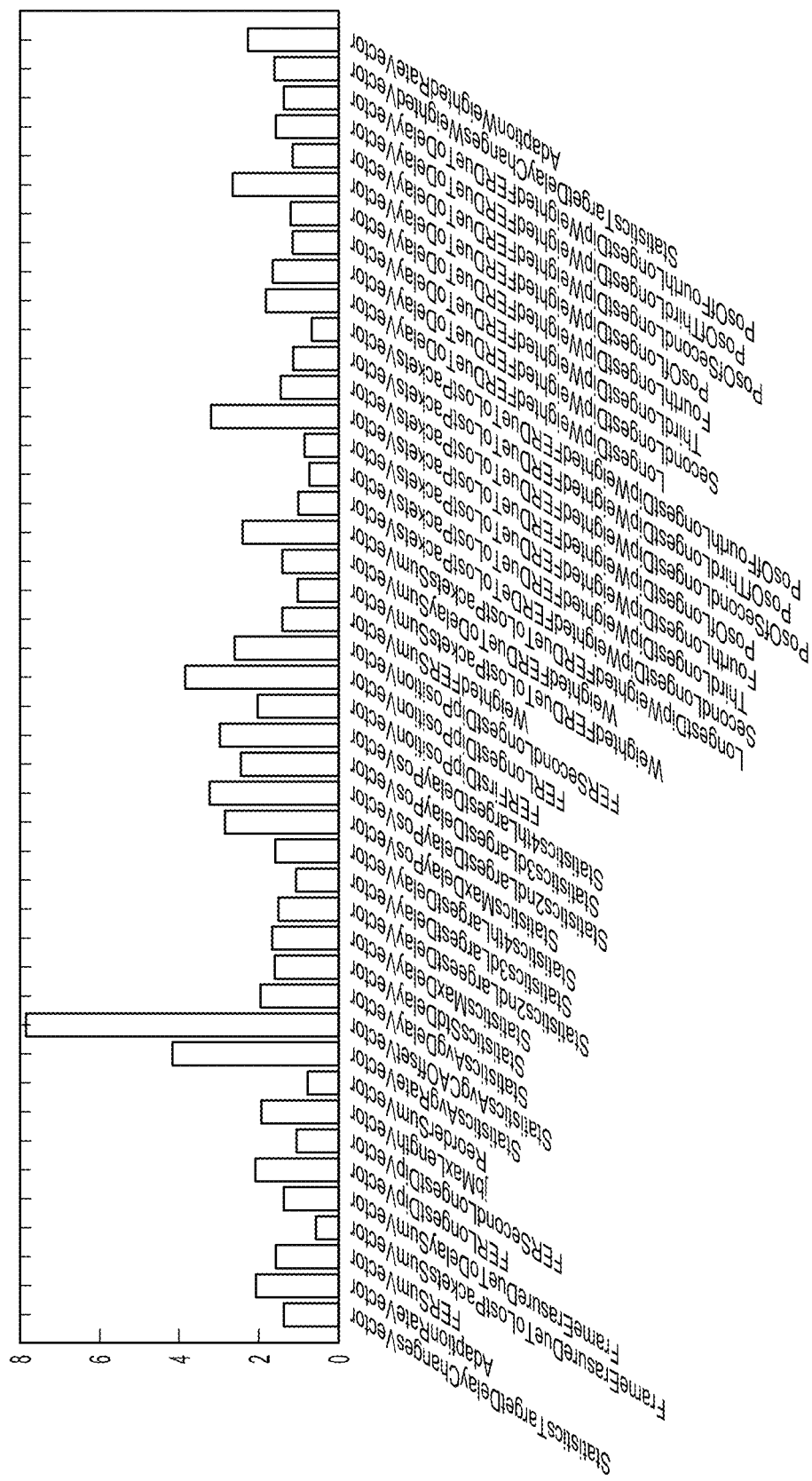
Fig. 14 - Features of the machine learning algorithm

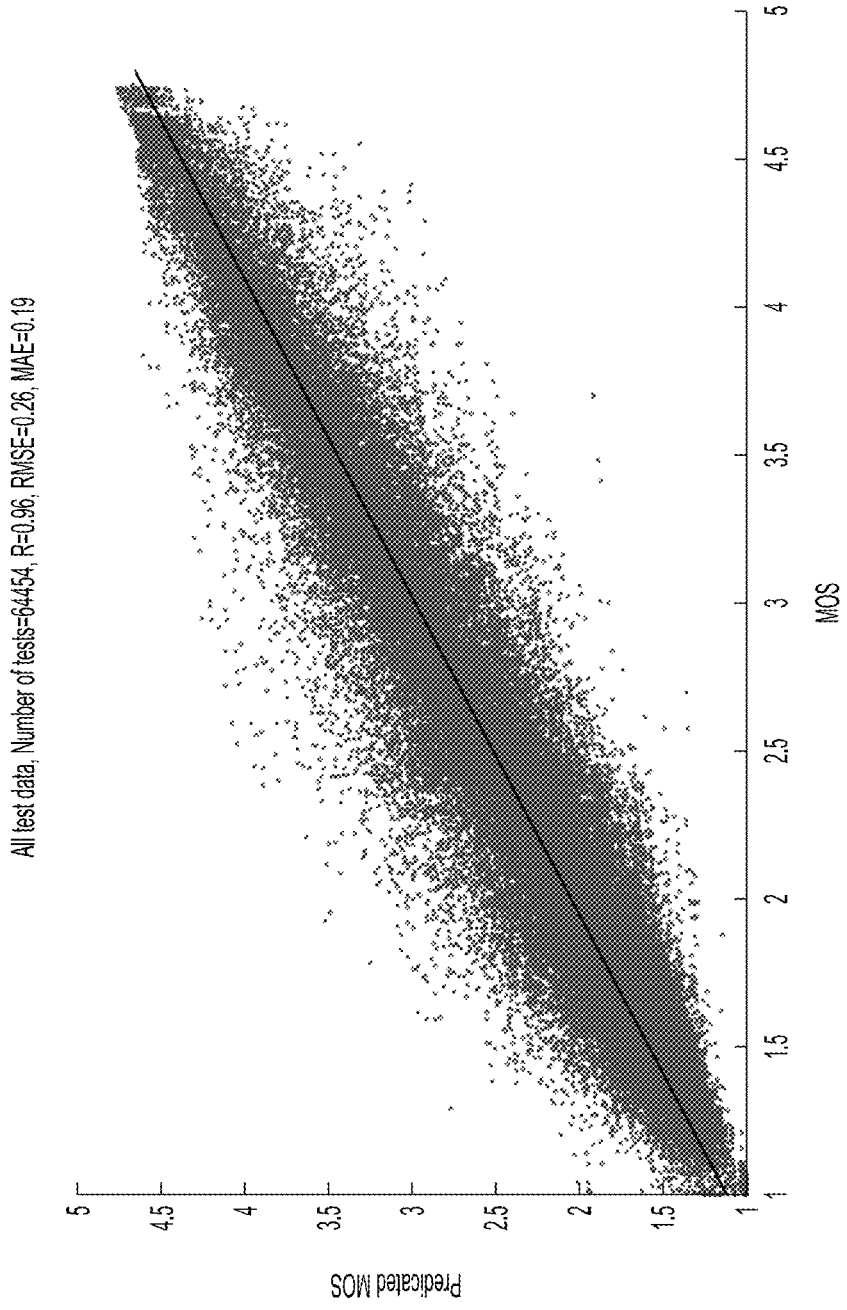
Fig. 15 - Using all features(audio reference based and non-audio referenced based):
R=0.96, MAE=0.19, RMSE=0.26

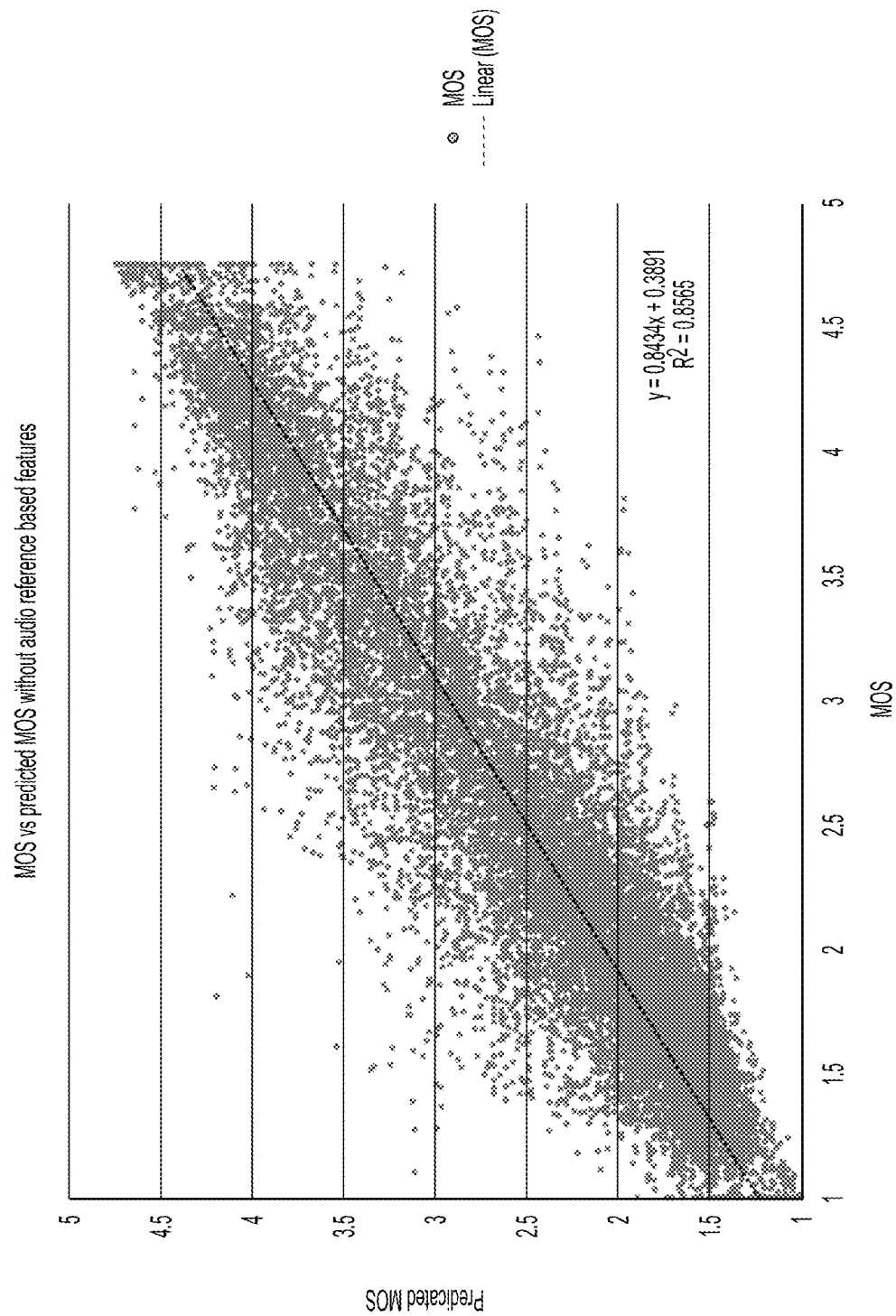
*Fig. 16* – Using only non-audio reference based features, R=0.926, MAE=0.272, RMS=0.376

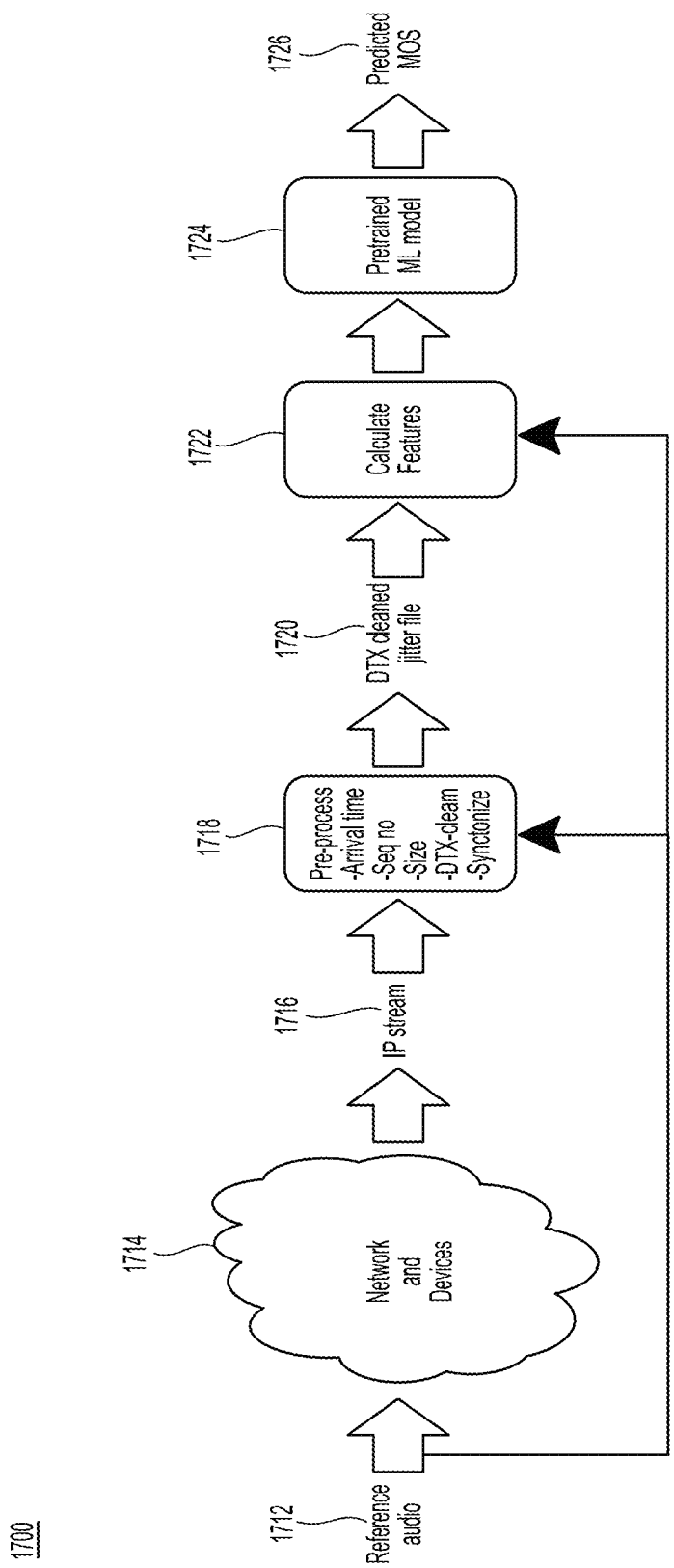
*Fig. 17* - Run time test set up of the QoE predictor

SYSTEM AND METHOD FOR MACHINE LEARNING BASED QOE PREDICTION OF VOICE/VIDEO SERVICES IN WIRELESS NETWORKS

RELATED APPLICATIONS

Priority is claimed to U.S. Provisional Patent Application No. 62/554,790, filed Sep. 6, 2017. The contents of the aforementioned application are incorporated by reference in their entirety.

FIELD OF THE INVENTION

The subject matter of the present application concerns quality of experience prediction in cellular networks. More particularly, it concerns a machine-learning approach that does not rely on recorded voice samples.

BACKGROUND

The exponential growth of the myriad of services supported by today's 3G/4G and soon to come 5G wireless networks demand flexible, automated Quality of Experience (QoE) centric evaluation, troubleshooting and optimization. Voice and video services' QoE performance are leading operators' concerns for CAPEX/OPEX optimization towards no churn as well as revenue increase. Therefore, easy to implement, control and real time act on QoE predictors are crucial for cost efficiently optimized networks operations.

Prior state of the art related to QoE estimation refers to two types of algorithms: intrusive and non-intrusive.

(i) Intrusive Algorithms

The intrusive algorithms provide voice quality scores by comparing reference (transmitted over the network) and degraded (received over the network) voice samples. Therefore, intrusive assessment techniques require access to both the transmission and reception ends of communication. Comparing time-frequency processed reference and degraded voice samples based on human perception and cognition models facilitates an accurate estimation of the subjective perception of voice quality received by the terminal. Developing and validating this type of algorithm is based on subjective listening tests using a large number of listeners who are subjectively scoring (MOS, Mean Opinion Score) many voice samples databases, represented by voice clips of 5-10 sec length containing a pair of short sentences separated by silence spoken by male and female talkers. These voice sample databases cover various network real life and simulated conditions.

In today's industry many network testing tools are using the standardized intrusive quality estimation algorithm P.863 ([1]-[3]) also called POLQA when provided as an algorithm to the industry. POLQA is the global standard for benchmarking end to end voice quality of fixed, mobile and IP based networks. It was standardized by the International Telecommunication Union (ITU-T) as Recommendation P.863 in 2011 and can be applied for end to end voice quality estimation as perceived by users of Narrow Band (NB), High Definition (HD) and Super Wide Band (SWB) voice, on Circuit Switched (CS) 3G and Packet Switched (PS) 4G/VoLTE networks.

(ii) Non-Intrusive Algorithms

Non-intrusive algorithms can be network parameter based or voice based.

Parametric methods can use RF and/or IP parameters for predicting quality. Their limitation comes from the fact that these algorithms can only predict quality affected either by the radio access network or by the IP network.

The prior art includes a proprietary solution, Speech Quality Index, SQI, [4]-[6] and an ITU-T standardized solution P.564 [7]. The SQI algorithm provides a MOS estimate based on RF parameters (e.g. BLER, FER) and their distribution, and codec characteristics (e.g. type, bandwidths and bit rate). The algorithm consists of a weighted multivariable non-linear function of the RF and codec information elements which function is optimized to predict a MOS score, as provided by POLQA. The SQI algorithm is applicable to Narrow Band (NB) CS voice, 3G networks. It is not suitable for VoIP or any other HD voice, respectively VoLTE services.P.564 defines a framework rather than an algorithm per se, and it considers only IP parameters (e.g. packet loss, jitter) and codec characteristics (e.g. type, bandwidths and bit rate). The framework relies on weighted multivariable non-linear function of IP and codec information elements. P.564 is standardized for NB VoIP services aimed at a fixed rather than a mobile network.

Voice based non-intrusive methods use human perceptual and cognitive models, similar to intrusive solutions in order to estimate voice quality. However, unlike the intrusive solutions, the non-intrusive voice based algorithms use as input only the degraded/received voice sample. Therefore, these algorithms need to use predictions regarding the transmitted original voice based on the degraded signal. Strong degradations could easily affect the accuracy of these predictions and, therefore, the overall voice quality evaluation. As a result, even though they are based on the processing of the voice signal using human perception and cognition models, these algorithms are recommended only when large amount of samples are available for averaging.

The prior art also includes ITU-T standard P.563 [8] which is suitable for NB CS 3G voice services.

SUMMARY

The invention refers to a framework system for developing hybrid voice/video QoE predictors. In the present context, "video" refers to video conversational, but it does not preclude video streaming. The voice/video QoE predictors are considered to be hybrid predictors because they use both network/codec/client parameters as well as the reference voice/video reference sample(s). Thus, the hybrid voice/video QoE predictors can be considered intrusive parametric: intrusive because it uses a reference voice/video which is to be sent over the network under test, and parametric because it uses network/codec/client parameters.

The prediction model/algorithm uses deep packet inspection to produce relevant input and therefore the network's impact on the voice/video QoE can be determined without recording actual media (voice/video) content. Thus, the invention's QoE predictors are neither solely media based as state of the art perceptual metrics, nor state of the art parametric based. In addition, unlike state of the art hybrid video QoE which use the recorded media (applicable for video QoE predictors only), the invention's hybrid voice/video QoE uses the reference/original media information.

The framework applies machine learning techniques for QoE prediction. Machine learning algorithms are used to untangle the complex relationship between network/client/codec parameters and MOS. The learning process is based on a large database which contains simulated and live data samples.

In one aspect, the subject matter of present application is directed to a system for developing voice/video services hybrid QoE (Quality of Experience) predictors for voice/video IP based services on a network, the system comprising:

a framework structure including:
a learning and evaluation database generator module;
a machine learning based module configured to create a machine learning model for a QoE prediction algorithm based on network/codec/client parameters as well as reference voice/video samples, but without using recorded voice/video samples; and
a statistical evaluation module.

The subject matter of the present application also includes any of the following additional features, in any combination:

a. The learning and evaluation database generator module is configured to create a drive testing learning database and a drive testing evaluation database, based on: (a) error patterns present in a live network, and (b) amplified and/or modulated versions of said error patterns.

b. The learning and evaluation database generator module is further configured to create a plurality of additional learning and evaluation databases, based on offline voice/video client data and codec behavior.

c. The learning and evaluation database generator module is configured to create each of the databases based on at least 1000 error patterns per codec rate and channel aware mode, under conditions in which at least one-half of the voice quality MOS scores are below 2.5.

d. The machine learning based module is configured to learn the MOS scale without additional calibration.

e. The machine learning based module is configured to predict voice/video QoE based on one or more of the non-audio-based reference features listed in Table 4 below.

f. The machine learning based module of paragraph 'e' immediately above is configured to predict voice/video QoE based also on one or more of the audio-based reference features listed in Table 4 below.

g. The machine learning based module is configured to predict voice/video QoE based only on one or more of the audio-based reference features listed in Table 4 below, and none of the non-audio-based reference features listed in Table 4.

h. The database generator module is configured to receive, as database generator inputs, (a) reference voice samples, (b) EVS codec/client information parameters, and (c) network error patterns; in response to these database generator inputs, the database generator module is configured to output (a) Jitter files comprising error patterns, and MOS/P.863 measures corresponding to each of the Jitter files, each MOS measure indicating a voice quality of the corresponding Jitter file; each Jitter file and corresponding MOS measure comprises a data pair; and the various data pairs are partitioned into a learning set of data pairs constituting a learning database, and an evaluation set of data pairs constituting an evaluation database.

i. The machine learning based module is configured to receive, as machine learning input, the learning set of data pairs constituting the learning database, and in response to the machine leaning input, the machine learning based module is configured to output (a) a plurality of features/attributes, (b) machine learning based MOS measures, and (c) a machine learning model.

j. the statistical evaluation module is configured to receive, as statistic evaluation inputs, (a) the evaluation set of data pairs constituting the evaluation database, and (b) the machine learning model created by the machine learning based module; and in response to these statistical evaluation inputs, the statistical evaluation module is configured to output (a) machine learning model performance statistics including at least correlation coefficients and/or prediction error.

k. The framework system may further comprise a pre-processing module configured to create a DTX cleaned jitter file in which jitter and packet loss during DTX (discontinuous transmission) periods have been removed.

l. The pre-processing module of paragraph 'k' immediately above is configured to add payload information to the DTX cleaned jitter file, the payload information comprising at least codec rates.

m. The payload information of paragraph 'l' immediately above may further comprise channel aware modes.

n. The payload information of paragraph 'm' immediately above may further comprise speech bandwidth.

o. The payload information of paragraph 'l' above may further comprises video frame rate and video resolution.

In another aspect, the subject matter of the present application is directed to a hybrid QoE (Quality of Experience) predictor for IP based services, created in accordance with any the above systems.

Run time requirements and test set-up of the QoE predictor are also contemplated.

The subject matter of the present application also discloses method of predicting MOS (Mean Opinion Score) during run time, comprising:

sending a reference voice sample from a sending wireless device to a receiving wireless device using an RTP/IP (Real Time Protocol/Internet) protocol, the receiving wireless device having a local copy of the reference voice sample;

at the receiving wireless device, receiving a RTP/IP stream and synchronizing the received RTP/IP stream with the local copy of the reference voice sample, based on a DTX (discontinuous transmission) pattern and voice frames within the reference voice sample;

extracting one or more audio-based and/or one or more non-audio-based features; and predicting the MOS using the above-mentioned hybrid QoE predictor.

BRIEF DESCRIPTION OF THE DRAWINGS

The subject matter of the present application can be described with reference to the following figures:

FIG. 1 shows the Framework Structure in accordance with one embodiment of the subject matter of the present application.

FIG. 2 shows an exemplary Simulation chain.

FIG. 3 shows an example of delay amplifications for a live base Jitter file.

FIG. 4 shows an example of Frame Erasure (FE) due to late loss which is evenly distributed over the audio.

FIG. 5 shows the distribution of all test and training MOS values.

FIG. 6 shows pre-processing of the jitter file.

FIG. 7 shows a Machine learning based model architecture.

FIG. 8 shows a calculated target playout delay feature and real EVS client target playout.

FIG. 9 shows per frame MOS values versus Target delay during one audio reference of 5.5 s.

FIG. 10 shows the modules of the EVS Jitter Buffer Management Solution from 3GPP TS 26.448.

FIG. 11 shows a scenario of two long jitter delays in silent parts which have no effect on MOS values; both examples have the same MOS of 4.5.

FIG. 12A shows an example of Predicted MOS (output of Machine Learning based framework) vs. P.863 for low FER at various AMR rates.

FIG. 12B shows an example of Predicted MOS (output of Machine Learning based framework) vs. P.863 for low FER at various EVS rates.

FIG. 13 shows an example of Predicted MOS (output of Machine Learning based framework) vs. P.863 for low FER and all EVS Channel Aware Modes.

FIG. 14 shows the features used the machine learning algorithm, and their significance, as determined by the Machine Learning Algorithm.

FIG. 15 shows results of using all features (audio reference based and non-audio reference based): R=0.96, MAE=0.19, RMSE=0.26.

FIG. 16 shows results of using only non-audio reference based features, R=0.926, MAE=0.272, RMS=0.376.

FIG. 17 shows a Run time test set up of the QoE predictor.

DETAILED DESCRIPTION

FIG. 1 show a framework having a three module structure: The three modules include a learning and evaluation database generator module 118, a machine learning based module 146, and a statistical evaluation module 168. It is understood that the modules are implemented in software on a computer. The three modules 118, 146, 168 each belong to a respective processing block 110, 140, 160, each processing block including the corresponding module along with its inputs and outputs.

The framework is based on machine learning techniques with three-folded advantages. First, the complexity of the inter-dependencies between all network/codec/client parameters as well as their significance of impacting the voice quality is better described and coped with by machine learning algorithms than the multidimensional optimization required for the estimation of new coefficients' of a multi-variable non-linear functions generally used for parametric QoE metrics. Second, whenever changes for introducing new codecs/clients are required, machine learning techniques are more flexible and quicker to tune. Last, but not least, there is no need for additional calibration to the MOS scale, using first or third order polynomial, since the machine learning based algorithm "learn" the exact MOS scale that they need to predict.

The invention framework uses VoLTE—Enhanced Voice Service (EVS) codec based, but it can be applied to any other OTT (over-the-top) voice service (e.g. Skype, Viber, WhatsAppP) and/or video services (e.g. ViLTE, FaceTime) using other codecs/clients.

Learning and Evaluation Database Generator Module

The database generator module 118 is configured to receive, as database generator inputs, (a) reference voice sample(s) 112, (b) EVS codec/client information parameters (rate, bandwidth) 114, and (c) a large set of network error (jitter/loss) patterns 116 with various combinations of values and distributions. In response to these database generator inputs, the database generator module 118 is configured to output (a) Jitter files 120 comprising error patterns, and (b) MOS/P.863 measures 122 corresponding to each of the Jitter files 120, each MOS measure indicating a voice quality of the corresponding Jitter file 120. Thus, each Jitter File 120 and corresponding MOS measure 122 can be considered a data pair 120/122. The collection of data pairs 120/122 are then partitioned into a learning set of data pairs 142/144 constituting a learning database, and an evaluation set of data pairs 162/164 constituting an evaluation database. It should be noted here that one may (i) consider the learning set of data pairs 142/144 to comprise Jitter files related to learning data and MOS/P.863 measures 164 related to learning data, and (ii) consider the evaluation set of data pairs 162/144 to comprise Jitter files related to evaluation data and MOS/P.863 measures 164 related to evaluation data.

In one embodiment, reference voice file(s) per ITU-T P.863 and/or ETSI requirements (in the case of drive test scenarios in mobile networks) are used. Therefore, one or several reference voice files (female-male talker combo) can be used. In addition, the length of the files used can be 5.5 sec, within the limits defined by ETSI for drive testing scenarios in mobile networks.

The network error pattern files 116 contain combination of packet loss and jitter and are defined by a "jitter" file in a column format suitable for machine learning input format. The learning and evaluation database should contain large amounts of data points using simulations and combinations of simulations and drive test data covering as much as possible the entire voice quality range. In one embodiment, a 50%-50% split between learning and evaluation database is used as recommended for machine learning techniques.

Simulation Chain Used for Generating the Databases

FIG. 2 shows an exemplary simulation chain 200.

The generator module 118 uses a simulator which is based on 3GPP standardized code for both the EVS VoIP client and the EVS voice codec. The simulations are performed on IP level without using radio layer and are based on knowledge gained from analyzing real life data collected during drive testing Since the VoIP client is standardized all devices using Enhanced Voice Services (EVS) will behave the same and there is no need to use different devices. The simulation chain is using the EVS VoIP client and the EVS coder and decoder.

A reference audio file 212 is inserted to the simulation chain and first submitted to an EVS coding submodule 214 where it is coded with different EVS codec settings for bandwidth, codec rate and channel aware mode. The resulting output is called a VoIP file 216 which has coded audio packets together with an ideal arrival time increasing 20 ms for each packet. Network errors, in the form of jitter and packet loss patterns 218, are applied to the coded audio to simulate degradations from an IP network. To simulate the jitter behavior of a radio and core network 220 the arrival time is updated according to a Jitter file.

The Jitter file contains two columns with comma separated packet number and arrival time in milliseconds. For example, the packet number can go from 1 to 275 for a 5.5 s long audio reference corresponding to one packet each 20 ms. In one embodiment, a starting arrival time is 500 ms indicating a one-way delay of 500 ms. The Jitter file also decides which packet shall be lost. Packet loss is indicated by a missing packet number and arrival time pair.

To apply Jitter files, and thereby simulate network degradations, a program has been developed to remove EVS frames when there is packet loss and changes to the arrival time of the frames, both according to the jitter file.

The new jittered VoIP file 222 is submitted to an EVS Decoding module 224 comprising the EVS jitter buffer, and subjected to decoding and time scaling. This produces a degraded audio file 226. The degraded audio file 226 is finally graded using P.863 (POLQA algorithm) 228 and comparing output of P.863 to the original reference audio 212/230, resulting in a MOS/P.863 score 232.

Jitter files describe the jitter and packet loss a network can inflict on the packet transmission and are an input to the simulation chain. The Jitter files are created by a combination of simulations and drive test data. All relevant codec rates, bandwidth and channel aware modes are also input to the simulation chain. The result is the jitter/MOS (P.863) databases.

A set of five databases covering a broad range of conditions are generated:
1. "Live (drive test) data modulated with simulations" to broaden the conditions' range (e.g. randomizing the live degradation position and amplitude).
2. "Gilbert burst packet loss and burst jitter up to 30%". This mimic error cases seen in live drive test data, for example during handover, where packets are buffered and suddenly released.
3. "Gilbert severe burst jitter to 70%". This database improves the learning and testing of large jitter which is the hardest case to predict.
4. "Random packet loss and random jitter". This database handles reordering of packets.
5. "Manually designed packet loss". This database simulates a mobile device going in and out of coverage resulting in long and short consecutive packet losses.

The following describes an example of how each of the above listed five databases can be generated.

Database #1—Live (Drive Test) Data Modulated with Simulations

The drive test for the live jitter was performed in an American metropolitan area. The drive route was carefully planned to give varying results. Measurements were performed on two of the most popular brands of smartphone devices on three of the large operators. All operators used DRX (Discontinuous Receive) which gives a "background" jitter with arrival times of 0 ms or 40 ms each second packet.

To create a base Jitter file which can be modulated, parts of the RTP stream giving decreased MOS are cut out matching the audio reference. DTX at the start, middle and end are replaced with normal background jitter (0 or 40 ms). This result represents one base Jitter file. The base Jitter file is run through a script to modulate the error patterns. First, the jitter and packet loss are shifted to a predetermined first number P of different positions to simulate the errors occurring at any time during the audio. In one embodiment, a first number P=20 different positions are used. Second, for every of the P=20 positions, the positive jitter (local delay increase), is also amplified by a second number N of different scaling factors. In one embodiment, the number of scaling factors is N=5, and scaling factors corresponding to 1.0, 1.1, 1.25, 1.5 and 2.0 (0%, 10%, 25%, 50% and 100%, respectively) are used. Thus, every base Jitter file will result in a total of M=P×N Jitter files, and in this exemplary example, every base Jitter file results in 100 Jitter files. FIG. 3 shows exemplary delay amplifications a total of N=5 scaling factors using a shift of 10

The positive jitter amplification is performed when the time difference is larger than 55 ms, based on the jitter buffer's initial size of 60 ms, to avoid amplifying the jitter background from DRX and other insignificant jitter delays. To avoid the absolute delay to increase beyond reasonable values, amplified positive jitter must be followed by amplified negative jitter (local delay decrease). The negative jitter is performed where a negative jitter in the original RTP stream exists. Negative jitter is detected when the time difference is almost zero for two packets in a row. The negative jitter is applied as long as there is no new local delay increase. The sum of the delay increase and decrease is managed by a delay budget where the aim is to get the budget to zero. This will result in the amplified jitter keeping a similar shape as the original delay curve and implies the scaling is a good simulation of real jitter, see FIG. 3.

Database #2—Gilbert Burst Packet Loss and Burst Jitter

A Markov chain according to the Gilbert model is implemented to generate burst packet loss. The model is extended to jitter by calculating the delay peaks from the number of consecutive losses generated by the Gilbert model. When a peak occurs, it will be followed by packets arriving at the same time until the total delay goes to zero or a new burst loss occurs, using the same method as described in delay amplifying of the live data.

When there is jitter, the EVS jitter buffer (and probably most other buffer implementations) will prefer to increase the total delay and thereby keep the late loss down. This means the jitter buffer makes the probability of late loss larger in the beginning of the audio than at the end when the buffer has had time to increase. To make the late loss distribution more rectangular, the delay generated from the Gilbert simulation is extended with a probability for the start of the simulation. The start is rectangle distributed between packet number 1 and 175 so there is always at least 100 packets for the delays to be simulated over. FIG. 4 shows an exemplary Frame Erasure count, due to late loss to be evenly distributed over the audio.

Applying the Jitter files generated by the Gilbert burst packet loss and burst jitter model on the EVS simulator shows that using losses of 30% for both packet loss and jitter gives a satisfactory distribution of the MOS values.

Database #3 Gilbert Severe Burst Jitter

Extensive research shows the Machine Learning has the most difficulties with severe jitter. A Gilbert simulated database with jitter up to 70% was created to improve the learning and verify the algorithm's prediction power in these circumstances.

Database #4—Random Packet Loss and Random Jitter

Random jitter both positive and negative combined with random packet loss has been simulated. The random distribution is uniform and packet loss is simulated up to 50% and jitter is simulated up to delays of +−200 ms. This type of simulation will make packets arrive out of sequence order.

Database #5—Manually Designed Test Cases

An important packet loss scenario is when the device goes in and out of coverage. This will lead to long consecutive packet losses. Manual test cases for consecutive loss of 1, 2, 3, 4, 5, 6, 8, 16, 32, 64 and 128 packets are designed. Also, combinations of two consecutive packet losses are designed. For every test case, the loss positions are shifted to 20 different positions. For short packet losses they shall be shifted to all possible positions.

Generally, poor voice quality conditions are the hardest cases to predict by the machine learning based algorithm, and therefore requiring more learning. Thus, the learning and evaluation generated databases should contain a significant amount of severe network conditions. This is seen for the presented case (FIG. 5) in the distribution of MOS/P.863 values for all used databases; a total of 128881 jitter/MOS (P.863) files have been simulated for each audio reference.

It is crucial for the machine learning algorithm to learn accurately also from conditions which can be less frequent in the real world, but still likely; without being exposed to these kind of conditions, the machine learning can provide misleading results.

Pre-Processing of Jitter Files

Content, frequency and silence duration and distribution within voice play an important part in the MOS estimation process and with significant impact on the estimation's accuracy. Therefore, the framework uses reference voice samples along with the network/codec/client parameters as mentioned previously.

FIG. 6 shows one embodiment of the pre-processing methodology (module) 600 applied to the jitter file 612 used in conjunction with an input VoIP file 614 comprising EVS coded packets in VoIP file format. In order to keep the jitter files 612 independent of codec and reference voice sample and to simplify the feature creation, two pre-processing operations 618 are performed on the Jitter files: DTX cleaning and adding on codec information.

DTX cleaning pre-processing takes care of the fact that DTX periods, occurring during silence, do not impact the perceived voice quality. Consequently, the pre-processing operation creates a new "DTX cleaned" Jitter file 619 with no packet loss and no jitter during DTX periods, which greatly simplifies the feature creation.

During silence, for EVS, there is a DTX packet every 8*20 ms which is a network dependent parameter. The payload of a DTX packet is less than an ordinary voice packet. The DTX-cleaning pre-process generates packets every 20 ms and the arrival time continues from the moment the DTX period started. Any reference voice sample starts with silence, consequently a DTX period. This is a special case which requires a different way to calculate the arrival time; it uses as reference point the first audio packet in the reference voice sample and recalculates the arrival time backwards from this packet. The result from the DTX-cleaning pre-process is a new "DTX cleaned" Jitter file 618 and a new coded output audio file 620 with no degradations during DTX. Like the input audio VoIP file 614, the new coded output audio VoIP file 620 also comprises EVS coded packets. However, in the new coded output audio VoIP file 620, some packets are missing and the packets themselves may have changed time stamps.

Add-on codec information represents the second pre-processing step. The codec information is added to the "DTX cleaned" Jitter file 618, and it may include audio payload size and Channel Aware mode indication. Packet payload size indirectly gives both codec rate and information as to whether DTX was used. This information is given for every packet since they can change on per packet level.

Referring back to FIG. 6, as a result of the pre-processing operations 618, the pre-processing module 600 creates a new "DTX cleaned" Jitter file 618. In the DTX cleaned jitter file 618, jitter and packet loss during DTX (discontinuous transmission) periods have been removed. Furthermore, The DTX cleaned Jitter file 618 may also include additional information ("payload information"). The payload information may take the form of, e.g., additional columns in the DTX cleaned Jitter file 618. The payload information may convey information about the codec rate for that packet. In some embodiments, in addition to codec rate, the payload information may further convey information about channel aware modes and/or speech bandwidth. And in the case of video, the payload information may further convey information video frame rate and video resolution. It is understood that the code rates, the channel aware modes, speech bandwidth, video frame rates and video resolution can be determined from the size and/or content of the payload information.

To summarize, the pre-processing module 600 handles codec specific operations like DTX, codec rate, and channel aware mode, and consequently keeps the Jitter files both codec and reference voice sample independent. Therefore, it is possible to use these files in the generic framework.

Machine Learning Based Module

Returning to FIG. 1, the machine learning based module 146 is configured to receive, as machine learning input, the aforementioned learning set of data pairs 142/144 constituting the learning database. In response to this machine learning input, the machine learning based module 146 is configured to output (a) various features/attributes 148 (described below), (b) machine learning based MOS measures 150, and (c) a machine learning model 152 (also referred to as a "machine learning algorithm").

FIG. 7 presents the architecture of the machine learning based module 700. The module's architecture presented in FIG. 7 is used for both selecting the features/attributes as well as predicting MOS/P.863.

The input 712 to the machine learning based module 700 comprises IP/RTP based information, such as codec rate, bandwidth, DTX packet loss and Jitter. In one embodiment, the machine learning model 714 itself comprises a decision tree algorithm (e.g., the well-known Tree Bagger algorithm). The output of the machine learning model comprises the machine learning MOS estimates 716.

In one exemplary embodiment, the following values were used for the two main parameters of the algorithm: Leaf size=5 and Number of trees which have been determined by testing many combinations=100. These values provided the best correlation but the exact values proved not to be critical, but rather only from the processing time length point of view. In addition, while decision trees category showed very good fit for the analyzed use case, also other algorithms like Support Vector Regressor and neural networks will work as well, as the machine learning model 714.

Feature Creation

The following describes the creation of the features to be used later by the machine learning algorithm, for feature selection and predicting MOS/P.863. The features refer to the EVS codec use case.

The feature creation process is based on three sources. (1) the information from the RTP stream generated by the simulated jitter buffer implementation; (2) some statistical measures built from the RTP stream which proved through extensive testing that have a significant impact on algorithm's accuracy against P.863/POLQA; and (3) codec-specific information like codec rate and channel aware mode.

In addition, in order to improve the correlation towards voice based P.863/POLQA MOS, audio reference based features are recommended as well. These features use the location of each feature in the reference voice sample.

1. Creation of Statistical Features

A list of the statistical features is presented in Table 1.

TABLE 1

| Statistical features |
| --- |
| Average delay |
| Standard deviation of delay |
| Maximum delay |
| Second largest delay |
| Third largest delay |
| Fourth largest delay |
| Target delay changes |

These features are self-explanatory, except for "Target delay changes". Target delay tries to mimic the statistical calculations performed by the EVS VoIP client (3GPP TS 26.448). Simulations and tests have been performed to compare the target playout delay calculated by the feature and the target playout delay from the real EVS VoIP client. One example of this, for very high jitter, is shown in FIG. 8. In FIG. 8, the solid line 812 represents the Feature-based TargetPlayoutDelay for High jitter and the broken line 814 represents the EVS-based TargetPlayoutDelay for High jitter. The resemblance between the Feature-based and EVS-based behavior is evident, attesting to the validity of the Feature-based approach.

FIG. 9 presents MOS and EVS target playout delay during a reference audio of 5.5 s. The EVS target playout delay 912 increases rapidly during parts of the audio having high distortions (as indicated by the MOS 914). This means the total amount of target delay change (in %) is a good feature. Correlation tests on data with severe jitter also indicate this, where the correlation increased from 0.84 to 0.88 by adding the Target delay changes feature.

2. Creation of Audio Reference Based Features

During drive test the audio references sent are always known so this information is used for referenced based features. There are two types of reference based features:
1) The location (packet number or time in msec since start of the reference) of the start of a delay or a Frame Erasure dip (explained in section 3 below, "Creation of Jitter buffer based features")
2) A weighting function, which weights the Frame erasure dips, based on the RMS (Root Mean Square) of 20 ms frames in the reference audio. The estimated reason for the Frame Erasure, delay or loss, decides which audio frames should be used for weighting. This is explained in section 3 below, "Creation of Jitter buffer based features"

Different weighting functions and scaling of the weights can be used, but RMS with a simple constant scaling of 3 gives a good compromise between implementation effort and result. The overall model also benefits of the advantage of using a known reference by training a separate Machine Learning model per reference.

3. Creation of Jitter Buffer Based Features

A simulated jitter buffer is a handles time delay variations (jitter). FIG. 10 shows an overview of an EVS jitter buffer management sub-module 1000 for a wireless receiver.

As seen in FIG. 10, incoming RTP packets 1012 are input to a RTP Depacker 1036 to extract the EVS frames 1014. The EVS frames 1014 from the RTP Depacker 1036 are fed to a De-jitter buffer 1032, and also to a Network Jitter Analysis and Target Delay Estimation Block 1022. An Adaptation Control Logic Block 1024 receives output from the Network Jitter Analysis and Target Delay Estimation Block 1022, and also from a Playout Delay Estimation Block 1026. The Adaption Control Logic Block 1024 is configured to send control logic signals to the De-jitter Buffer 1032 and also to a Time Scale Modification Block, and both of the latter two are configured to output signals to the Playout Delay Estimation Block 1026. After temporarily residing in the De-jitter Buffer 1032, the EVS frames 1014 are decoded in an EVS Decoder 1034 to produce decoded audio signals 1016. The decoded audio signals 1016 are then input to a Time Scale Modification Block 1036 where the decoded audio signals are time-scaled (compressed or stretched) to account for Jitter. Finally, the time-scaled decoded audio signals 1016 are queued a Receiver Output Buffer 1038, for eventual output as an audible signal.

The present inventors have conducted research to find the most important characteristics of the EVS codec and how it impacts audio. This was performed both by logging information from the codec and visualizing how different delays in the IP-stream affected the decoded audio. If a 20 ms audio frame can't be played out from the jitter buffer when it should, it is called a Frame Erasure (FE). Frame Erasure Rate (FER) is the percentage of lost frames at the playout instance. Case studies for how the EVS handles network errors include the following:

1. Network jitter during silence or close to silence. The Packet Loss Concealment (PLC) generates silent or close to silent frames and increases the overall delay. All of the audio is still in the recording, only later than it should be. Adding silence to already silent parts has no effect on the perceptual quality and POLQA reflects this. In FIG. 11, the top audio waveform 1110 represents an "original" audio file, while the bottom audio waveform 1112 represents a "degraded" audio file in which two silent parts 1114*a*, 1114*b* have been inserted by the EVS client. Both waveforms 1110, 1112 have the same MOS score of 4.5. This illustrates how jitter delays during silent positions have no effect on the MOS score. The feature following from this is "FER due to delay weighted by RMS of the audio at the last played packet before the buffer became empty."

2. Network jitter during the speech. The PLC generates estimated speech and increases the overall delay. All of the audio from the reference is still in the recording but with some degraded audio inserted. The PLC is based on the last packet before the delay and converges to the background noise (see section 5.3.1 of 3GPP 26.447). The convergence speed depends on the audio but about 3-4 packages are usually needed to reach the background noise. This was verified from a couple of voice examples. The first correct frame after the delay will be modified to avoid discontinuities (see 5.3.3.3 of 3GPP 26.447). Correlation tests show no improvement by using a limit of 3-4 for the Frame Erasure so the feature described in case 1 can handle also this case.

3. Too late (out of order) or lost packets. The PLC generates estimated speech for the lost packets up to 3-4 packets. The degradation will become worse the more consecutive packets which are lost, and this will be handled by the machine learning. The feature becomes: "FER due to lost packets weighted by the RMS of the audio at the lost packet."

4. Delay in general. The jitter buffer prefers to keep delays, introduced by jitter, instead of removing packets to decrease the overall delay. This behavior has been built into the simulated jitter buffer and is reflected by a feature called "Jitter Buffer max length."

5. Actual playout delay differs from target playout delay. When the target delay differs from actual delay the jitter buffer can perform either frame based adaption or signal based adaption (called "time scaling"). To capture this, a feature called "Adaption" is introduced. Adaption is the difference between target playout delay and estimated playout delay (from the simulated jitter buffer) when larger than 60 ms out of order packets. This case is handled by a feature called "ReorderSum" which counts the number of reorders in the simulated jitter buffer.

Table 2 shows a list of the jitter buffer based features.

TABLE 2

| Jitter based features |
|---|
| Adaption rate |
| Weighted Adaption rate |
| FER (weighted and without weight) |

TABLE 2-continued

Jitter based features

FER due to delay (weighted and without weight)
FER due to lost packets (weighted and without weight)
FER dips 1..4 (weighted and without weight)
FER dip positions
Jitter Buffer max length
ReorderSum 4. Codec Based Features (Rate and Channel Aware)

The DTX cleaning pre-process adds two columns in the cleaned Jitter files with codec data for each packet:
1) Audio payload size
2) Channel aware mode 4.1 Codec Rate The audio payload size is used as a measure of the codec rate. The feature is calculated as the average of the payload size, with DTX packets excluded, and thereby it can handle the variable rate of the EVS 5.9 kbit/s and might also handle rate adaption which could be enabled in the future.

To check if the ML algorithm can predict all rates in one model or if separate models for each rate are needed, the test below is performed. On the database for severe jitter, simulations of rates 9.6, 13.2, 16.4 and 24.4 are run with training performed both on all rates and on each separate rate. The test shows a correlation of 0.877 for training on all rates and a correlation of 0.883 for training one model per rate. The difference is acceptable and so one model for all rates can be used.

Since the MOS for a network with very good quality is the most likely value in a real drive test (i.e., in a real wireless network), it is important to predict the MOS accurately for each rate. This was tested on all databases with all rates up to 24.4 (see Table 3) for a US English reference audio file.

TABLE 3

MOS and Predicted MOS for EVS rates

| EVS and AMR IO rates (US English) | Max MOS | Max Predicted MOS | Difference |
|---|---|---|---|
| 5.9 | 4.05 | 4.03 | 0.03 |
| 6.6 | 3.92 | 3.95 | −0.02 |
| 7.2 | 4.16 | 4.16 | 0.00 |
| 8 | 4.27 | 4.21 | 0.06 |
| 8.85 | 4.35 | 4.33 | 0.02 |
| 9.6 | 4.56 | 4.54 | 0.02 |
| 12.65 | 4.55 | 4.53 | 0.01 |
| 13.2 | 4.57 | 4.57 | 0.00 |
| 16.6 | 4.71 | 4.68 | 0.03 |
| 23.85 | 4.58 | 4.60 | −0.03 |
| 24.4 | 4.75 | 4.72 | 0.02 |

The trend for medium to bad frame erasure rates (FER) must also be tested. The result is seen in FIGS. 12A and 12B, which compare MOS (per P.863) with predicted MOS (based on the output of the present machine learning based framework), as a function of frame erasure rate (FER). FIG. 12A illustrates how well the MOS predictor works under varying AMR rates, while FIG. 12B shows this under varying EVS rates. In FIG. 12A, chart 1212 shows the comparison for an AMR rate of 6.60, chart 1214 shows the comparison for an AMR rate of 8.85, chart 1216 shows the comparison for an AMR rate of 12.65, and chart 1218 shows the comparison for an AMR rate of 23.85. In FIG. 12B, chart 1222 shows the comparison for an EVS rate of 5.90, chart 1234 shows the comparison for an EVS rate of 9.6, chart 1226 shows the comparison for an EVS rate of 13.2, and chart 1228 shows the comparison for an EVS rate of 24.4. It can be seen that MOS and Predicted MOS are very close for FER<10% and almost the same for FER>10%. This shows the good discrimination power of the Predicted MOS in highly degraded conditions.

4.1 Channel Aware Mode

The channel aware (CA) mode improves the error resilience especially on channels with burst errors by piggybacking important audio on later packets. This way, even if a packet is lost, the important part of its audio can be recreated from a later packet. FIG. 13 compares MOS (per P.863) with predicted MOS/POLQA (based on the output of the present machine learning based framework), as a function of frame erasure rate (FER), in various channel aware modes. In FIG. 13, chart 1312 shows the comparison for channel aware mode 2, chart 1314 shows the comparison for channel aware mode 3, chart 1316 shows the comparison for channel aware mode 5, and chart 1318 shows the comparison for channel aware mode 7 Overall, FIG. 13 shows that the present Machine Learning based model is able to predict MOS/POLQA reasonably well.

Feature Selection

Ideally, one would like to know which features will provide the most accurate QoE predictor, either the highest correlation with MOS/P.863 and/or the lowest prediction error versus MOS/P.863, as described in the "Statistical Evaluation Module". One (tedious) approach, is to add and remove features in a structured way, finding out which features improve correlation with MOS/P.863 and which do not. Another (less tedious and more precise) approach is to use machine learning. As discussed above, the Tree Bagger machine learning algorithm is one implementation in accordance with the subject matter of the present application, and can be used for ML-MOS predictor estimation.

FIG. 14 and Table 4 below show an example of various features/attributes along with their calculated confidence by the Tree Bagger algorithm. A machine learning calculated confidence value of 1 represents a guidance of the minimum required confidence for a feature to be selected.

TABLE 4

Feature type and performance

| Feature | Audio reference based | Statistical/ Jitter buffer/ Codec | Confidence from ML algorithm | Preferred feature for EVS |
|---|---|---|---|---|
| StatisticsTargetDelayChanges | No | Statistical | 1.4 | No |
| AdaptionRate | No | Jitter buffer | 2.1 | No |
| FERSum | No | Jitter buffer | 1.5 | Yes |
| FrameErasureDueToLostPacketsSum | No | Jitter buffer | 0.5 | No |

TABLE 4-continued

Feature type and performance

| Feature | Audio reference based | Statistical/ Jitter buffer/ Codec | Confidence from ML algorithm | Preferred feature for EVS |
|---|---|---|---|---|
| FrameErasureDueToDelaySum | No | Jitter buffer | 1.3 | No |
| FERLongestDip | No | Jitter buffer | 2.1 | No |
| FERSecondLongestDip | No | Jitter buffer | 1 | No |
| jbMaxLength | No | Jitter buffer | 1.9 | Yes |
| ReorderSum | No | Jitter buffer | 0.8 | Yes |
| StatisticsAvgRate | No | Codec | 4.2 | Yes |
| StatisticsAvgCAOffset | No | Codec | 7.9 | Yes |
| StatisticsAvgDelay | No | Statistical | 2 | Yes |
| StatisticsStdDelay | No | Statistical | 1.6 | Yes |
| StatisticsMaxDelay | No | Statistical | 1.7 | Yes |
| Statistics2ndLargestDelay | No | Statistical | 1.5 | Yes |
| Statistics3dLargestDelay | No | Statistical | 1 | Yes |
| Statistics4thLargestDelay | No | Statistical | 1.6 | Yes |
| StatisticsMaxDelayPos | Yes | Statistical | 2.9 | Yes |
| Statistics2ndLargestDelayPos | Yes | Statistical | 3.2 | Yes |
| Statistics3dLargestDelayPos | Yes | Statistical | 2.5 | Yes |
| Statistics4thLargestDelayPos | Yes | Statistical | 3 | Yes |
| FERFirstDipPosition | Yes | Jitter buffer | 2 | Yes |
| FERLongestDipPosition | Yes | Jitter buffer | 3.8 | No |
| FERSecondLongestDipPosition | Yes | Jitter buffer | 2.6 | No |
| WeightedFERSum | Yes | Jitter buffer | 1.4 | No |
| WeightedFERDueToLostPacketsSum | Yes | Jitter buffer | 1 | Yes |
| WeightedFERDueToDelaySum | Yes | Jitter buffer | 1.4 | Yes |
| LongestDipWeightedFERDueToLostPackets | Yes | Jitter buffer | 2.4 | Yes |
| SecondLongestDipWeightedFERDueToLostPackets | Yes | Jitter buffer | 1 | Yes |
| ThirdLongestDipWeightedFERDueToLostPackets | Yes | Jitter buffer | 0.7 | Yes |
| FourthLongestDipWeightedFERDueToLostPackets | Yes | Jitter buffer | 0.8 | Yes |
| PosOfLongestDipWeightedFERDueToLostPackets | Yes | Jitter buffer | 3.2 | Yes |
| PosOfSecondLongestDipWeightedFERDueToLostPackets | Yes | Jitter buffer | 1.5 | Yes |
| PosOfThirdLongestDipWeightedFERDueToLostPackets | Yes | Jitter buffer | 1.1 | Yes |
| PosOfFourthLongestDipWeightedFERDueToLostPackets | Yes | Jitter buffer | 0.7 | Yes |
| LongestDipWeightedFERDueToDelay | Yes | Jitter buffer | 1.8 | Yes |
| SecondLongestDipWeightedFERDueToDelay | Yes | Jitter buffer | 1.6 | Yes |
| ThirdLongestDipWeightedFERDueToDelay | Yes | Jitter buffer | 1.1 | Yes |
| FourthLongestDipWeightedFERDueToDelay | Yes | Jitter buffer | 1.2 | Yes |
| PosOfLongestDipWeightedFERDueToDelay | Yes | Jitter buffer | 2.7 | Yes |
| PosOfSecondLongestDipWeightedFERDueToDelay | Yes | Jitter buffer | 1.1 | Yes |
| PosOfThirdLongestDipWeightedFERDueToDelay | Yes | Jitter buffer | 1.6 | Yes |
| PosOfFourthLongestDipWeightedFERDueToDelay | Yes | Jitter buffer | 1.3 | Yes |
| StatisticsTargetDelayChangesWeighted | Yes | Statistical | 1.6 | Yes |
| AdaptionWeightedRate | Yes | Jitter buffer | 2.3 | Yes |

The final selection of the feature set to be used should be decided by the comparison of the statistical measures (correlation and prediction error against MOS/P.863) for the candidate sets. A QoE which uses the audio reference based features can also benefit, in some use cases, from some of the non-audio reference based features. In addition the codec, jitter buffer implementation and the ML algorithm used can lead to slightly different selection of features. For the EVS use case, with the Tree Bagger algorithm, using audio reference based features, the preferred selection is shown in Table 4.

Statistical Evaluation Module

As seen in FIG. 1, the statistical evaluation module 168 is configured to receive, as statistical evaluation inputs, (a) the aforementioned evaluation set of data pairs 162/164 constituting the evaluation database, and (b) the aforementioned machine learning model 152 (also referred to as a "machine learning algorithm"), created by the machine learning based module 146, as described above. In response to these statistical evaluation inputs, the statistical evaluation module 168 is configured to output (a) machine learning model performance statistics 170 including at least correlation coefficients and/or prediction error.

The statistical evaluation module needs to perform the statistical evaluation against MOS/P.863 (high accuracy mode). Correlation coefficient and prediction error (e.g. RMSE) statistics are the main performance metrics used (see P.1401). In addition, the evaluation should be performed on unknown data (i.e., data not used in learning, training, etc.), which resulted from the initial 50% split of the learning and evaluation database generator module. Minimum performance requirements may be specified, but these may be case dependent.

FIGS. 15 and 16 present results for predicting MOS of the VoLTE-EVS codec. FIG. 15, presents a scatterplot of results across a very large number of samples (more than 60000 samples; evaluation data bases only as required by an accurate analysis) and using all the position and non-position weighted features. The data in FIG. 15 has a correlation coefficient of 96%, an RMSE of 0.26MOS, and a mean absolute value of 0.19MOS. FIG. 16 presents a scatterplot of results for the proved non-favourable scenario when only the non-position weighted features are used. The data in FIG. 16 has a correlation coefficient of 0.92, a RMSE of 0.38MOS and a mean absolute error of 0.28MOS.

These performance values are fair considering (a) the large number of learning and evaluation data points, (b) the difficulty created by the severity of the network conditions; and (c) in comparison with other existing/available ITU-T non-perceptual voice/video QoE metrics.

Run Time Requirements and Test Set Up for the QoE Predictor

One aim of the present framework is to create a valid and accurate voice QoE predictor that operates in a real network. In order to maintain the QoE predictor accuracy when implemented in a field measurement tool, some run-time requirements and test set up requirements need to be met.

A. Reference Voice Samples

As explained above, the machine learning based QoE predictor has been trained using reference files. Therefore, during run time, when the algorithm is deployed, the same reference files must be injected to the network under test. The measurement methodology and reference file(s) requirements should follow the P.863/P.863.1 specifications.

B. Pre-Processing in Run Time

The pre-processing phase a run time should be performed in the same way as during simulations. In addition, during run time the pre-processing needs to synchronize the received voice and the IP/RTP stream to make sure the audio reference based features reflect the reference voice. This should be performed by correlating the pattern of DTX and voice frames with the reference voice samples. No recorded voice is needed though.

C. Measurement Procedure

Since the ML based QoE predictor uses the same measurement set-up as for P.863 (except the need for the recorded degraded voice sample), then comparing results achieved with both types of models enables the possibility to troubleshoot less obvious degradations such as the ones occurring outside of the transport network, e.g. emerged from analogue audio parts.

FIG. 17 shows one embodiment of a run time test set up of the present QoE predictor. A sending wireless device has one or more reference audio files (i.e., reference voice samples) 1712 resident therein, and a receiving wireless device has a local copy of the same reference audio files. The sending wireless device sends one or more of the reference audio files to the receiving wireless device using an RTP/IP (Real Time Protocol/Internet) protocol over a wireless network 1714 to which both devices subscribe. The receiving wireless device receives a RTP/IP stream 1716 which is then processed. A preprocessing module 1718 resident in the receiving wireless device is configured to, among other things, synchronize the received RTP/IP stream with the local copy of the reference voice sample, based on a DTX (discontinuous transmission) pattern and voice frames within the reference voice sample, to thereby produce a DTX cleaned Jitter file 1720. The DTX cleaned Jitter file 1720 is further processed by a feature determining module 1722 resident in the receiving wireless device. The feature determining module 1722 is configured to calculate and/or extract one or more audio-based and/or one or more non-audio-based features discussed above. Then, the pre-trained Machine Learning module 1724 (also resident in the receiving wireless device) determines the predicted MOS 1726. In some embodiments, the reference audio 1712 is also fed directly to the pre-processing module 1718 for synchronization, and also to the feature determining module 1722 for audio reference-based feature calculation.

Potential Advantages of the Present Approach of Employing a ML-Based QoE Predictor Unlike intrusive and non-intrusive solutions, present approach addresses both the framework for developing the QoE predictor as well as the QoE prediction algorithm itself.

Intrusive and non-intrusive voice based solutions address only the algorithm itself, while non-intrusive parametric based solutions only the framework, which is limited only to minimum performance requirements and not covering the whole process needed to develop a QoE predictor, network simulator module and the created voice sample databases, algorithm module and statistical algorithm's performance evaluation module.

None of the intrusive and non-intrusive prior art algorithms covers such a wide quality range of conditions as the present approach, which includes a large number of samples at the lower end of the scale.

Therefore, the present approach uniquely benefits of a significant robustness, since only the extreme network conditions seriously challenges a QoE algorithm's performance, especially when deployed and running in a network testing tool, like drive testing tools.

The present approach is applicable to the latest voice technology VoLTE [12] using the latest released codec, EVS (Enhanced Voice Services), [9]-[11], [13], including Full Bandwidth (FB) (in addition to NB, WB and SWB) voice and channel aware (CA) mode of the codec. None of the non-intrusive solutions address these conditions. In addition, intrusive POLQA does not cover the FB and the EVS codec—CA mode; in the sense that the algorithm has not been trained and/or validated on these conditions, and knowledge about its behavior in these scenarios is fairly unknown.

Therefore, the present approach becomes uniquely suitable for the latest as well as future voice technologies (FB voice, EVS codec with CA mode) to be deployed rather sooner than later.

The present approach is neither intrusive (using both reference and degraded voice samples), nor non-intrusive parametric (using only network parameters) nor non-intrusive voice based (using degraded voice sample). The present approach uses network (RTP stream) and codec parameters as well as the voice reference sample(s). Therefore, the QoE predictors generated by the present framework are hybrid, being based on both parameters and voice signal. In addition, the present approach also uses real life EVS client information, unlike any non-intrusive or intrusive solutions.

Therefore, the present approach combines the benefits of a simpler, faster, less computational demanding solution similar to non-intrusive ones, but yet with accuracy comparable to that of an intrusive solution. The latter is achieved using the reference voice signal. In addition, using real life EVS client information allows the present approach to take into consideration any error concealment that can compensate for errors in the network and therefore making them not perceivable to human; our algorithm will reflect this effect.

Unlike intrusive POLQA and non-intrusive voice based P.563, the present approach does not apply complex and computation demanding human perception and cognitive models on the voice samples; it also does not perform any complex frequency Bark transformation based analysis on the voice signal. Instead, the present approach uses only a time analysis of voice power and silence distribution to be correlated with the DTX events. This time analysis ensures that the present approach's QoE prediction considers the human aspect that degradations during silence do not affect human perception. Therefore a good accuracy with low complexity is ensured.

Unlike intrusive POLQA and non-intrusive voice based P.563, the present approach does not require recording actual received voice sample. This is possible, because the prediction model/algorithm uses packet inspection to produce relevant input information elements and therefore the network's impact on the voice QoE can be determined without recording actual received voice sample. This allows for a simpler implementation and test set up which is quite crucial for any network testing tool running real time field measurements such as drive testing tools.

Unlike any prior art, intrusive and non-intrusive approaches, the present approach is based on machine learning techniques [17]-[22]. This approach has significant scientific, technical and implementation advantages, placing the present solution in a unique position, not present in any prior art.

Furthermore, using machine learning can potentially provide the following benefits which are believed to be absent in the prior art:

(1) The complexity of the inter-dependencies between network, codec and client parameters as well as their significance in impacting the QoE is better described and coped with by machine learning algorithms, rather than applying weighted multivariable non-linear functions found in non-intrusive solutions.

(2) Any time changes are required due to the introduction of new codecs or clients, machine learning techniques show to be more flexible and quicker to tune than multidimensional optimization required for the estimation of new coefficients of a multivariable non-linear function found in non-intrusive solutions.

(3) There is no need for additional calibration to the MOS scale, using first or third order polynomial, as intrusive and non-intrusive solutions require, since the machine learning based algorithm "learns" the exact MOS scale that is needed to predict the QoE.

(4) Unlike any of the prior art intrusive and non-intrusive solutions, the algorithm of the present framework can be trained, tuned and validated by using machine learning based on large databases of sampled information that will form the basis for training of the algorithm rather than performing costly subjective listening tests, as required for intrusive and non-intrusive solutions.

When compared with the prior art, the present approach potentially brings new knowledge as follows:

(1) The use of the combination of RTP stream, codec/client information and time analysis of voice reference (transmitted) sample, without the need of recording the received voice sample.

(2) A solution which is faster, flexible, easier to implement and improve.

(3) A network simulator covering a wide quality range, including the most severe conditions as well as an easy way to create a large amount of data. Large voice samples databases browsing a wide range of quality levels including the lower end is crucial for the performance/accuracy and robustness of QoE prediction algorithms implemented in network testing tools.

(4) The use of the real life EVS client information and behavior which uniquely allows to reveal and quantify through the QoE predictor, to what extent error concealment schemes compensate for the network degradations.

(5) Introducing and benefiting of machine learning for QoE prediction: better description of the interdependencies between network/codec/client and human perception, flexible and easy to adapt to new technologies and/or new devices, cost efficient due to no need to run subjective testing for MOS calibration (to the 1-5MOS scale).

The above description of various embodiments is intended to describe and illustrate various aspects of the invention, and is not intended to limit the invention thereto. Persons of ordinary skill in the art will understand that certain modifications may be made to the described embodiments without departing from the invention. All such modifications are intended to be within the scope of the appended claims.

The references below are incorporated by reference to the extent necessary to understand the subject matter disclosed herein.

REFERENCES—PRIOR ART SCIENTIFIC BIOGRAPHY

[1] ITU-T P.863, Perceptual objective listening quality assessment
[2] ITU-T P.863.1, Application guide for Recommandation ITU-T P.863
[3] User Manual POLQA OEM Library, Version 1.22, by OPTICOM GmbH
[4] SQI for GSM and WCDMA, by David Lindegren, Ericsson
[5] SQI for AMR through simulated CS UMTS system, Xiangchun Tan, Ericsson
[6] Speech Quality Measurement with SQI, ASCOM
[7]. ITU-T P.564, Conformance testing for voice over IP transmission quality assessment models
[8]. ITU-T P.563: Single-ended method for objective speech quality assessment in narrow-band telephony applications

REFERENCES—OTHER SCIENTIFIC BIOGRAPHY RELATED TO THE TOPIC

[9] 3GPP TS 26.447, 3rd Generation Partnership Project; Technical Specification Group Services and System Aspects; Codec for Enhanced Voice Services (EVS); Error Concealment of Lost Packets (Release 14)
[10] 3GPP TS 26.448, 3rd Generation Partnership Project; Technical Specification Group Services and System Aspects; Codec for Enhanced Voice Services (EVS); Jitter Buffer Management (Release 14)
[11] 3GPP TS 26.445, 3rd Generation Partnership Project; Technical Specification Group Services and System Aspects; Codec for Enhanced Voice Services (EVS); Detailed Algorithmic Description (Release 14)
[12] 3GPP TS 26.114, Technical Specification, 3rd Generation Partnership Project; Technical Specification Group Services and System Aspects; IP Multimedia Subsystem (IMS);
[13] 3GPP Enhanced Voice Services (EVS) codec, by Nokia
[14] ITU-T STUDY GROUP 12—CONTRIBUTION 281 A subjective ACR LOT testing EVS speech coding and prediction by P.863, by Rohde & Schwarz
[15] ITU-T STUDY GROUP 12—CONTRIBUTION 282 Analysis of POLQA/P.863 Performance for EVS Conditions, by OPTICOM GmbH
[16] ITU-T STUDY GROUP 12—CONTRIBUTION 341 Evaluation of P.863 for EVS conditions, by Qualcomm, Incorporated
[17] machinelearningmastery.com
[18] se.mathworks.com
[19] psych.brookes.ac.uk

What is claimed is:
1. A system for developing voice/video services hybrid QoE (Quality of Experience) predictors for voice/video RTP/IP based services on a network, the system comprising:
a framework structure including:
a learning and evaluation database generator module configured to:

receive, as inputs, (a) reference voice/video samples, (b) EVS codec/client information parameters, and (c) a set of jitter/loss network error patterns; and in response thereto:
output (a) jitter files comprising error patterns, and (b) MOS/P.863 measures corresponding to each of the jitter files, each MOS measure indicating a voice quality of the corresponding jitter file, thereby forming a plurality of jitter file/MOS measure data pairs; and
partition the plurality of data pairs into a learning set of data pairs constituting a learning database and an evaluation set of data pairs constituting an evaluation database;
a machine learning based module configured to:
receive, as input, the learning set of data pairs constituting the learning database; and in response thereto:
create a machine learning model for a QoE prediction algorithm; and
a statistical evaluation module configured to:
receive, as input, (a) the evaluation set of data pairs constituting the evaluation database; and (b) the machine learning model created by the machine learning based module; and in response thereto:
output machine learning model performance statistics including at least correlation coefficients and/or prediction errors;
wherein:
the QoE predictors pertain to the quality of received voice/video signals, and
the QoE predictors are based on (i) a reference voice/video which is to be sent over the network under test, and (ii) network/codec/client parameters received in the RTP/IP stream.

2. The framework system according to claim 1, wherein the learning and evaluation database generator module is configured to create a drive testing learning database and a drive testing evaluation database, based on: (a) error patterns present in a live network, the error patterns having various combination of values and distributions, and (b) amplified and/or modulated versions of said error patterns.

3. The system according to claim 2, wherein the learning and evaluation database generator module is further configured to create a plurality of additional learning and evaluation databases, based on offline voice/video client data and codec behavior.

4. The system according to claim 3, wherein the learning and evaluation database generator module is configured to create each of the databases based on at least 1000 error patterns per codec rate and channel aware mode, under conditions in which at least one-half of the voice quality MOS scores are below 2.5.

5. The system according to claim 4, wherein the machine learning based module is configured to learn the MOS scale without additional calibration of the QoE predictors to the MOS scale.

6. The system according to claim 5, wherein the machine learning based module is configured to predict voice/video QoE based on one or more non-audio-based reference features derived from statistics, aggregation and/or combination and/or ratios of the jitter and packet loss.

7. The system according to claim 6, wherein the machine learning based module is configured to predict voice/video QoE based also on one or more audio-based reference features derived from voice activity (DTX) distribution within the voice reference samples.

8. The system according to claim 5, wherein the machine learning based module is configured to predict voice/video QoE based:
only on one or more audio-based reference features derived from voice activity (DTX) distribution within the voice reference samples; and
on non-audio-based reference features derived from statistics, aggregation and/or combination and/or ratios of the jitter and packet loss.

9. The system according to claim 8, comprising a pre-processing module configured to create a DTX cleaned jitter file in which jitter and packet loss during DTX (discontinuous transmission) periods have been removed.

10. The system according to claim 9, wherein the pre-processing module is configured to add payload information to the DTX cleaned jitter file, the payload information comprising at least codec rates.

11. The system according to claim 10, wherein the payload information added to the DTX cleaned jitter file further comprises channel aware modes.

12. The system according to claim 10, wherein the payload information added to the DTX cleaned jitter file further comprises speech bandwidth.

13. The system according to claim 10, wherein the payload information added to the DTX cleaned jitter file further comprises video frame rate and video resolution.

14. A hybrid QoE (Quality of Experience) predictor for IP based services created in accordance with the system of claim 1.

15. A method of predicting MOS (Mean Opinion Score) during run time, comprising:
sending a reference voice sample from a sending wireless device to a receiving wireless device using an RTP/IP (Real Time Protocol/Internet) protocol, the receiving wireless device having a local copy of the reference voice sample;
at the receiving wireless device, receiving a RTP/IP stream and synchronizing the received RTP/IP stream with the local copy of the reference voice sample, based on a DTX (discontinuous transmission) pattern and voice frames within the reference voice sample;
extracting one or more audio-based and/or one or more non-audio-based features; and
predicting the MOS using the hybrid QoE predictor of claim 14.

16. A system for predicting MOS (Mean Opinion Score) during run time, comprising:
a sending wireless device configured to send a reference voice sample using an RTP/IP (Real Time Protocol/Internet) protocol; and
a receiving wireless device having a local copy of the reference voice sample and configured to:
receive a RTP/IP stream and synchronize the received RTP/IP stream with the local copy of the reference voice sample, based on a DTX (discontinuous transmission) pattern and voice frames within the reference voice sample;
extract one or more audio-based and/or one or more non-audio-based features, and
predict the MOS using the hybrid QoE predictor of claim 14.

\* \* \* \* \*